US008380833B2

(12) United States Patent
De Matteis et al.

(10) Patent No.: US 8,380,833 B2
(45) Date of Patent: Feb. 19, 2013

(54) METHOD OF CONFIGURING DEVICES IN A TELECOMMUNICATIONS NETWORK

(75) Inventors: Luca De Matteis, Bath (GB); Mark Robert Gibson, Bristol (GB); Adan K. Pope, Riverside, IL (US)

(73) Assignee: Amdocs Systems Limited, Bath (GB)

( * ) Notice: Subject to any disclaimer, the term of this patent is extended or adjusted under 35 U.S.C. 154(b) by 1272 days.

(21) Appl. No.: 11/473,003

(22) Filed: Jun. 22, 2006

(65) Prior Publication Data

US 2007/0198665 A1 Aug. 23, 2007

(30) Foreign Application Priority Data

Feb. 20, 2006 (GB) .................................. 0603360.9

(51) Int. Cl.
*G06F 15/173* (2006.01)

(52) U.S. Cl. ......................... 709/223; 709/220; 709/221

(58) Field of Classification Search .................. 709/223, 709/224, 219, 222, 220; 710/8; 707/4; 717/115, 717/140; 370/254
See application file for complete search history.

(56) References Cited

U.S. PATENT DOCUMENTS

| | | | | |
|---|---|---|---|---|
| 5,054,111 | A | 10/1991 | Goodwin | 455/34 |
| 5,185,860 | A | 2/1993 | Wu | 395/200 |
| 5,186,729 | A | 2/1993 | Brown et al. | 65/33 |
| 5,208,877 | A | 5/1993 | Murphy et al. | 385/12 |
| 5,821,937 | A | 10/1998 | Tonelli et al. | 345/356 |
| 5,831,610 | A | 11/1998 | Tonelli et al. | 345/335 |
| 5,864,541 | A | 1/1999 | Abu-Amara et al. | 370/253 |
| 5,886,907 | A | 3/1999 | Abu-Amara et al. | 364/578 |
| 5,905,715 | A | 5/1999 | Azarmi et al. | 370/244 |
| 5,943,480 | A | 8/1999 | Neidhardt | 395/200.56 |
| 5,963,911 | A | 10/1999 | Walker et al. | 705/7 |
| 6,055,240 | A | 4/2000 | Tunnicliffe | 370/428 |
| 6,075,631 | A | 6/2000 | Bala et al. | 359/124 |
| 6,091,713 | A | 7/2000 | Lechleider et al. | 370/248 |
| 6,094,580 | A | 7/2000 | Yu et al. | 455/446 |
| 6,097,722 | A | 8/2000 | Graham et al. | 370/395 |
| 6,101,538 | A | 8/2000 | Brown | 709/223 |
| 6,108,702 | A | 8/2000 | Wood | 709/224 |
| 6,141,552 | A | 10/2000 | Sendonaris et al. | 455/436 |
| 6,151,305 | A | 11/2000 | Chen | 370/238 |

(Continued)

FOREIGN PATENT DOCUMENTS

| | | | |
|---|---|---|---|
| CA | 2 290 221 | A1 | 5/2000 |
| CA | 2 405 263 | A1 | 10/2001 |

(Continued)

OTHER PUBLICATIONS

An amendment from the UK Application No. 0603360.9 filed on Apr. 18, 2008.

(Continued)

*Primary Examiner* — Joon H Hwang
*Assistant Examiner* — Joel Mesa
(74) *Attorney, Agent, or Firm* — Zilka-Kotab, PC

(57) ABSTRACT

A method of configuring a telecommunications system to provide a service involving multiple devices is disclosed. The method includes receiving a configuration script specifying a sequence of configuration instructions for configuring at least two of the devices to provide the service, and concurrently executing an instance of the configuration script for each of the at least two devices to configure the at least two devices to provide the service. The method can be used as part of a network management system or service provisioning system.

36 Claims, 7 Drawing Sheets

U.S. PATENT DOCUMENTS

| | | | | |
|---|---|---|---|---|
| 6,151,512 | A | 11/2000 | Chheda et al. | 455/562 |
| 6,173,175 | B1 | 1/2001 | Alazma et al. | 455/423 |
| 6,173,186 | B1 | 1/2001 | Dalley | 455/446 |
| 6,185,519 | B1 | 2/2001 | Lin et al. | 703/21 |
| 6,188,914 | B1 | 2/2001 | Chheda | 455/562 |
| 6,215,771 | B1 | 4/2001 | Turner et al. | 370/235 |
| 6,223,219 | B1 | 4/2001 | Uniacke et al. | 709/223 |
| 6,226,273 | B1 | 5/2001 | Busuioc et al. | 370/270 |
| 6,229,540 | B1 | 5/2001 | Tonelli et al. | 345/356 |
| 6,247,049 | B1 | 6/2001 | Scott | 709/222 |
| 6,253,065 | B1 | 6/2001 | Palmer | 455/67.3 |
| 6,266,694 | B1 | 7/2001 | Duguay et al. | 709/223 |
| 6,295,540 | B1 | 9/2001 | Sanschagrin et al. | 707/201 |
| 6,308,174 | B1 | 10/2001 | Hayball et al. | 707/10 |
| 6,310,883 | B1 | 10/2001 | Mann et al. | 370/408 |
| 6,314,093 | B1 | 11/2001 | Mann et al. | 370/351 |
| 6,314,109 | B1 | 11/2001 | Oman | 370/467 |
| 6,321,253 | B1 | 11/2001 | McKeen et al. | 709/204 |
| 6,336,035 | B1 | 1/2002 | Somoza et al. | 455/446 |
| 6,351,213 | B1 | 2/2002 | Hirsch | 340/506 |
| 6,356,627 | B1 | 3/2002 | Hayball et al. | 379/112.01 |
| 6,363,420 | B1 | 3/2002 | Coward | 709/221 |
| 6,393,475 | B1 | 5/2002 | Leong et al. | 709/223 |
| 6,396,810 | B1 | 5/2002 | Hebel | 370/248 |
| 6,405,248 | B1 | 6/2002 | Wood | 709/223 |
| 6,408,312 | B1 | 6/2002 | Forthman et al. | 707/203 |
| 6,411,798 | B1 | 6/2002 | Frenkel et al. | 455/67.4 |
| 6,420,968 | B1 | 7/2002 | Hirsch | 340/506 |
| 6,445,782 | B1 | 9/2002 | Elfe et al. | 379/201.01 |
| 6,449,253 | B1 | 9/2002 | Ott | 370/231 |
| 6,477,566 | B1 | 11/2002 | Davis et al. | 709/223 |
| 6,477,568 | B2 | 11/2002 | Borrett et al. | 709/223 |
| 6,480,718 | B1 | 11/2002 | Tse | 455/446 |
| 6,490,621 | B1 | 12/2002 | Forget et al. | 709/224 |
| 6,522,883 | B2 | 2/2003 | Titmuss et al. | 455/445 |
| 6,529,877 | B1 | 3/2003 | Murphy et al. | 705/7 |
| 6,539,221 | B1 | 3/2003 | Vasudevan et al. | 455/423 |
| 6,560,204 | B1 | 5/2003 | Rayes | 370/253 |
| 6,563,795 | B1 | 5/2003 | Gruber et al. | 370/248 |
| 6,578,005 | B1 | 6/2003 | Lesaint et al. | 705/8 |
| 6,600,749 | B1 | 7/2003 | Hayball et al. | 370/400 |
| 6,628,952 | B1 | 9/2003 | Hankins et al. | 455/446 |
| 6,643,837 | B2 | 11/2003 | Campbell et al. | 716/12 |
| 6,684,247 | B1 | 1/2004 | Santos et al. | 709/224 |
| 6,704,287 | B1 | 3/2004 | Moharram | 370/242 |
| 6,707,795 | B1 | 3/2004 | Noorhosseini et al. | 370/242 |
| 6,728,688 | B1 | 4/2004 | Hirsch et al. | 706/11 |
| 6,744,739 | B2 | 6/2004 | Martin | 370/254 |
| 6,766,165 | B2 | 7/2004 | Sharma et al. | 455/423 |
| 6,766,364 | B2 | 7/2004 | Moyer et al. | 709/221 |
| 6,771,873 | B2 | 8/2004 | Premaratne et al. | 385/147 |
| 6,802,044 | B2 | 10/2004 | Campbell et al. | 716/2 |
| 6,810,419 | B1 | 10/2004 | Bogler et al. | 709/224 |
| 6,832,074 | B2 | 12/2004 | Borras-Chia et al. | 455/67.13 |
| 6,836,466 | B1 | 12/2004 | Kant et al. | 370/252 |
| 6,836,748 | B2 | 12/2004 | Stupp | 702/183 |
| 6,842,463 | B1 | 1/2005 | Drwiega et al. | 370/468 |
| 6,857,014 | B1 | 2/2005 | Paterson et al. | 709/223 |
| 6,862,291 | B2 | 3/2005 | Talpade et al. | 370/412 |
| 6,865,151 | B1 | 3/2005 | Saunders | 370/230 |
| 6,882,657 | B1 | 4/2005 | Werner et al. | 370/437 |
| 6,892,169 | B1 | 5/2005 | Campbell et al. | 703/1 |
| 6,914,881 | B1 | 7/2005 | Mansfield et al. | 370/230 |
| 6,944,631 | B2 | 9/2005 | Peter | 707/104.1 |
| 6,996,510 | B1 | 2/2006 | Reilly et al. | 703/13 |
| 7,043,661 | B2 | 5/2006 | Valadarsky et al. | 714/4 |
| 2001/0051503 | A1 | 12/2001 | Lush | 455/2.01 |
| 2002/0035404 | A1* | 3/2002 | Ficco et al. | 700/65 |
| 2002/0091588 | A1 | 7/2002 | Benton et al. | 705/27 |
| 2002/0103850 | A1 | 8/2002 | Moyer et al. | 709/202 |
| 2002/0103898 | A1 | 8/2002 | Moyer et al. | 709/224 |
| 2002/0114309 | A1 | 8/2002 | Chow et al. | 370/347 |
| 2002/0120733 | A1 | 8/2002 | Kring | 709/223 |
| 2002/0124091 | A1 | 9/2002 | Kurose et al. | 709/228 |
| 2002/0131374 | A1 | 9/2002 | Lee | 370/254 |
| 2003/0115028 | A1 | 6/2003 | Summerfield et al. | 703/6 |
| 2003/0140142 | A1 | 7/2003 | Marples et al. | 709/225 |
| 2003/0154284 | A1* | 8/2003 | Bernardin et al. | 709/226 |
| 2003/0185205 | A1 | 10/2003 | Beshai | 370/370 |
| 2004/0081161 | A1 | 4/2004 | Held et al. | 370/395.3 |
| 2004/0095914 | A1 | 5/2004 | Katsube et al. | 370/338 |
| 2004/0107085 | A1 | 6/2004 | Moosburger et al. | 703/13 |
| 2004/0146008 | A1 | 7/2004 | Conradt et al. | 370/241 |
| 2004/0165562 | A1 | 8/2004 | Elaoud et al. | 370/338 |
| 2004/0243716 | A1 | 12/2004 | Ryll | 709/232 |
| 2004/0259565 | A1 | 12/2004 | Lucidarme | 455/453 |
| 2005/0010468 | A1 | 1/2005 | Power | 705/10 |
| 2005/0076339 | A1 | 4/2005 | Merril et al. | 718/104 |
| 2005/0132027 | A1 | 6/2005 | Vicente et al. | 709/220 |
| 2005/0138557 | A1 | 6/2005 | Bolder et al. | |
| 2005/0202811 | A1 | 9/2005 | Abed et al. | 455/426.2 |

FOREIGN PATENT DOCUMENTS

| | | | |
|---|---|---|---|
| CA | 2 401 714 | A1 | 5/2003 |
| CA | 2 489 304 | A1 | 11/2004 |
| CA | 2 451 947 | A1 | 6/2005 |
| CH | 686 540 | A5 | 4/1996 |
| CH | 691 419 | A5 | 7/2001 |
| DE | 40 41 442 | C1 | 6/1992 |
| DE | 42 42 808 | A1 | 6/1994 |
| DE | 197 40 718 | A1 | 9/1999 |
| DE | 198 21 461 | A1 | 11/1999 |
| DE | 199 16 632 | A1 | 4/2000 |
| DE | 199 24 988 | A1 | 12/2000 |
| DE | 101 58 080 | A1 | 6/2003 |
| DE | 102 10 742 | A1 | 10/2003 |
| DE | 102 26 315 | A1 | 1/2004 |
| DE | 103 00 709 | A1 | 8/2004 |
| DE | 103 11 697 | A1 | 10/2004 |
| DE | 103 18 292 | A1 | 11/2004 |
| DE | 103 37 464 | A1 | 12/2004 |
| DE | 103 38 053 | A1 | 3/2005 |
| EP | 0 673 135 | A1 | 3/1994 |
| EP | 0 619 682 | A2 | 10/1994 |
| EP | 0 762 712 | A2 | 3/1997 |
| EP | 0 847 213 | A2 | 6/1998 |
| EP | 0 854 607 | A1 | 7/1998 |
| EP | 0 899 910 | A2 | 3/1999 |
| EP | 0 899 911 | A2 | 3/1999 |
| EP | 0 899 912 | A2 | 3/1999 |
| EP | 0 899 913 | A2 | 3/1999 |
| EP | 0 914 016 | A2 | 5/1999 |
| EP | 0 923 269 | A2 | 6/1999 |
| EP | 0 923 270 | A2 | 6/1999 |
| EP | 0 963 077 | A2 | 12/1999 |
| EP | 0 977 460 | A2 | 2/2000 |
| EP | 1 026 867 | A2 | 8/2000 |
| EP | 1 043 871 | A2 | 10/2000 |
| EP | 1 091 614 | A2 | 4/2001 |
| EP | 1 098 245 | A1 | 5/2001 |
| EP | 1 102 433 | A2 | 5/2001 |
| EP | 1 109 413 | A1 | 6/2001 |
| EP | 1 111 840 | A2 | 6/2001 |
| EP | 1 150 455 | A2 | 10/2001 |
| EP | 1 172 967 | A2 | 1/2002 |
| EP | 1 221 667 | A1 | 7/2002 |
| EP | 1 231 739 | A1 | 8/2002 |
| EP | 1 298 505 | A1 | 4/2003 |
| EP | 1 298 838 | A1 | 4/2003 |
| EP | 1 298 839 | A1 | 4/2003 |
| EP | 1 298 840 | A1 | 4/2003 |
| EP | 1 313 261 | A1 | 5/2003 |
| EP | 1 326 370 | A1 | 7/2003 |
| EP | 1 326 453 | A1 | 7/2003 |
| EP | 0 943 196 | B1 | 11/2003 |
| EP | 1 378 841 | A1 | 1/2004 |
| EP | 1 398 905 | A1 | 3/2004 |
| EP | 1 401 146 | A1 | 3/2004 |
| EP | 1 437 859 | A1 | 7/2004 |
| EP | 1 445 909 | A1 | 8/2004 |
| EP | 1 460 798 | A1 | 9/2004 |
| EP | 1 460 859 | A1 | 9/2004 |
| EP | 1 460 860 | A1 | 9/2004 |
| EP | 1 467 516 | A1 | 10/2004 |
| EP | 1 533 940 | A1 | 5/2005 |
| GB | 2 318 478 | A | 4/1998 |
| GB | 2 319 710 | A | 5/1998 |

| | | | |
|---|---|---|---|
| GB | 2 332 832 | A | 6/1999 |
| GB | 2 338 860 | A | 12/1999 |
| GB | 2 344 963 | A | 6/2000 |
| GB | 2 393 606 | A | 3/2004 |
| GB | 2 435 362 | A | 8/2007 |
| WO | 94/11970 | | 5/1994 |
| WO | 95/23482 | | 8/1995 |
| WO | 96/42173 | | 12/1996 |
| WO | WO 97/40449 | * | 3/1997 |
| WO | 97/23101 | | 6/1997 |
| WO | 97/40449 | | 10/1997 |
| WO | WO97/40449 | | 10/1997 |
| WO | 98/29992 | | 7/1998 |
| WO | 98/30061 | | 7/1998 |
| WO | 98/33334 | | 7/1998 |
| WO | 98/47307 | | 10/1998 |
| WO | 98/53399 | | 11/1998 |
| WO | 99/00965 | | 1/1999 |
| WO | 99/03245 | | 1/1999 |
| WO | 99/09489 | | 2/1999 |
| WO | 99/17194 | | 4/1999 |
| WO | 99/22491 | | 5/1999 |
| WO | 99/37102 | | 7/1999 |
| WO | 99/63777 | | 12/1999 |
| WO | 00/08569 | | 2/2000 |
| WO | 00/26743 | | 5/2000 |
| WO | 00/36788 | | 6/2000 |
| WO | 00/57597 | | 9/2000 |
| WO | 01/03374 | A1 | 1/2001 |
| WO | 01/03378 | A1 | 1/2001 |
| WO | 01/13595 | A1 | 2/2001 |
| WO | 01/24448 | A1 | 4/2001 |
| WO | 01/25991 | A1 | 4/2001 |
| WO | 01/29663 | A1 | 4/2001 |
| WO | 01/29722 | A2 | 4/2001 |
| WO | 01/35576 | A2 | 5/2001 |
| WO | 01/47148 | A2 | 6/2001 |
| WO | 01/54350 | A2 | 7/2001 |
| WO | 01/54376 | A3 | 7/2001 |
| WO | 01/54425 | A2 | 7/2001 |
| WO | 01/55854 | A1 | 8/2001 |
| WO | 01/58189 | A1 | 8/2001 |
| WO | 01/69466 | A1 | 9/2001 |
| WO | 01/72056 | A2 | 9/2001 |
| WO | 01/74043 | A3 | 10/2001 |
| WO | 01/75589 | A2 | 10/2001 |
| WO | 01/75669 | A1 | 10/2001 |
| WO | 01/75701 | A1 | 10/2001 |
| WO | 01/75702 | A1 | 10/2001 |
| WO | 01/75703 | A1 | 10/2001 |
| WO | 01/75704 | A1 | 10/2001 |
| WO | 01/76267 | A1 | 10/2001 |
| WO | 01/84329 | A1 | 11/2001 |
| WO | 01/84331 | A1 | 11/2001 |
| WO | 01/84787 | A1 | 11/2001 |
| WO | 01/89141 | A2 | 11/2001 |
| WO | 01/91369 | A2 | 11/2001 |
| WO | 02/06918 | A2 | 1/2002 |
| WO | 02/13034 | A1 | 2/2002 |
| WO | 02/17526 | A2 | 2/2002 |
| WO | 02/23804 | A2 | 3/2002 |
| WO | 02/46927 | A2 | 6/2002 |
| WO | 02/47325 | A2 | 6/2002 |
| WO | 02/47326 | A2 | 6/2002 |
| WO | 02/47332 | A2 | 6/2002 |
| WO | 02/47333 | A2 | 6/2002 |
| WO | 02/056249 | A2 | 7/2002 |
| WO | 02/058407 | A2 | 7/2002 |
| WO | 02/065726 | A2 | 8/2002 |
| WO | 02/071691 | A2 | 9/2002 |
| WO | 02/075651 | A2 | 9/2002 |
| WO | 02/078363 | A1 | 10/2002 |
| WO | 02/080055 | A2 | 10/2002 |
| WO | 02/091209 | A3 | 11/2002 |
| WO | WO 02/091194 | A1 | 11/2002 |
| WO | WO02/091209 | | 11/2002 |
| WO | 02/103959 | A2 | 12/2002 |
| WO | 03/007546 | A2 | 1/2003 |
| WO | 03/009160 | A1 | 1/2003 |
| WO | 03/012704 | A1 | 2/2003 |
| WO | 03/017571 | A2 | 2/2003 |
| WO | 03/021415 | A1 | 3/2003 |
| WO | 03/021468 | A1 | 3/2003 |
| WO | 03/023665 | A1 | 3/2003 |
| WO | 03/027910 | A2 | 4/2003 |
| WO | 03/039070 | A2 | 5/2003 |
| WO | 03/039082 | A1 | 5/2003 |
| WO | 03/041325 | A2 | 5/2003 |
| WO | 03/041340 | A1 | 5/2003 |
| WO | 03/043262 | A1 | 5/2003 |
| WO | 03/046752 | A1 | 6/2003 |
| WO | 03/046781 | A1 | 6/2003 |
| WO | 03/053075 | A2 | 6/2003 |
| WO | 03/055143 | A1 | 7/2003 |
| WO | 03/081556 | A1 | 10/2003 |
| WO | 03/081844 | A1 | 10/2003 |
| WO | 03/084198 | A1 | 10/2003 |
| WO | 03/091918 | A1 | 11/2003 |
| WO | 03/098462 | A1 | 11/2003 |
| WO | WO 03/096188 | A1 | 11/2003 |
| WO | 03/102829 | A1 | 12/2003 |
| WO | 2004/002172 | A1 | 12/2003 |
| WO | 2004/004214 | A | 1/2004 |
| WO | 2004/006507 | A2 | 1/2004 |
| WO | 2004/008283 | A2 | 1/2004 |
| WO | 2004/008689 | A1 | 1/2004 |
| WO | 2004/008783 | A1 | 1/2004 |
| WO | 2004/023719 | A2 | 3/2004 |
| WO | 2004/027580 | A2 | 4/2004 |
| WO | 2004/032447 | A2 | 4/2004 |
| WO | 2004/045142 | A1 | 5/2004 |
| WO | 2004/047325 | A1 | 6/2004 |
| WO | 2004/064322 | A1 | 7/2004 |
| WO | 2004/088443 | A1 | 10/2004 |
| WO | 2004/107790 | A1 | 12/2004 |
| WO | 2005/013142 | A1 | 2/2005 |
| WO | 2005/017707 | A2 | 2/2005 |
| WO | 2005/034428 | A2 | 4/2005 |
| WO | 2005/067223 | A1 | 7/2005 |
| WO | 2005/071900 | A1 | 8/2005 |

OTHER PUBLICATIONS

Invitation to Pay Additional Fees and Communication Relating to the Results of the Partial International Search from application No. PCT/GB2007/000565 mailed on Jun. 4, 2007.

International Preliminary Examination Report from PCT Application No. PCT/GB2007/000565 mailed on Sep. 4, 2008.

Notification of Grant from PCT Application No. PCT/GB2007/000565 mailed on Oct. 28, 2008.

International Search Report and Written Opinion from International Application No. PCT/GB2007/000565, dated Sep. 3, 2007.

* cited by examiner

```
CT_Service.xml
<DII…/>
  <NE Name="device 1", …/>
    <DVI…/>
  <NE Name="device 2", …/>
    <DVI…/>
  <NE Name="device 3", …/>
    <DVI…/>

ADD CT_Service (…)
#STEP 1
       AT_1
       AT_2
       AT_3
end
```

METHOD OF CONFIGURING DEVICES IN A TELECOMMUNICATIONS NETWORK

RELATED APPLICATIONS

This application claims a benefit of priority under 35 U.S.C. §119 to GB Patent Application No. 0603360.9 by Luca De Matteis, Mark Robert Gibson and Adan K. Pope entitled "METHOD OF CONFIGURING DEVICES IN A TELECOMMUNICATIONS NETWORK" filed on Feb. 20, 2006, the entire contents of which are hereby expressly incorporated by reference for all purposes.

TECHNICAL FIELD OF THE INVENTION

The present invention relates to methods of configuring network devices in telecommunications networks to provide services.

BACKGROUND OF THE INVENTION

As telecommunications networks grow in complexity and the range of telecommunications services expands, the process of provisioning services—configuring the network to provide new services—is also becoming ever more complex. Existing approaches to service provisioning can be inflexible and inefficient, which can have a negative impact on a service operator's ability to provide a wide range of services, and to quickly implement new services. The definition of provisioning processes for new network services can be cumbersome and often requires detailed knowledge of network structures and device configuration. Service provisioning itself can, for complex services, involve many network configuration steps, which often results in slow turnaround of provisioning requests. The present invention seeks to alleviate some of these problems.

SUMMARY OF THE INVENTION

Accordingly, in a first aspect of the invention, there is provided a method of configuring a telecommunications system to provide a service involving a plurality of devices, comprising: receiving a configuration script specifying a sequence of configuration instructions for configuring at least two of the plurality of devices to provide the service; and concurrently executing an instance of the configuration script for each of the at least two devices to configure the at least two devices to provide the service.

In this way, definition of the steps needed to configure the network for a service can be simplified, whilst at the same time enabling the necessary configuration steps to be performed more efficiently.

The telecommunications system typically includes one or more telecommunications networks. The term 'telecommunications network' or 'telecommunications system' preferably refers to a network or system of interconnected devices (and possibly associated software) which provides telecommunications services. Optionally, other types of services may additionally be provided by or using the telecommunications network or system, for example data processing, storage, and retrieval services (e.g. application services). Examples of such services include a mailbox, web space, an interactive travel booking system, a multimedia content delivery system or an online game. Instead of a telecommunications network, the invention may also be applied to any other suitable type of communications system (for example a local area network) or information processing system comprising distributed interconnected devices which can be configured to provide communication functionality or other services.

The term "configuration script" preferably refers to a collection of configuration instructions. A script may define one or more sequences of configuration instructions. Sequences of configuration instructions may specify configuration operations in the order in which they are to be performed; however, control structures may also be provided to vary the execution order and execution options. Alternatively, instruction sequences may be executed in some other order, for example determined by efficiency considerations. A script may be in human-readable form, for example using a scripting language using defined terms and/or keywords, or using a mark-up language such as XML. Alternatively, a script may be in a form which is not easily human-readable, for example in the form of byte code or some other machine-readable encoding.

The term "concurrent execution" preferably includes both true parallel processing (for example on a multi-threaded or multi-core processor, multi-processor computer, or on multiple connected computers) and virtual parallel processing or multitasking, as performed, for example, by many multitasking operating systems, for example using time-sliced (interleaved) execution and context switching. Combinations of the two approaches may also be used to achieve concurrent execution.

The term "service" preferably refers to a telecommunications function or combination of telecommunications functions which may be provided or made available to a user (for example, an Internet access service, a video telephony service or a Virtual Private Network service).

Preferably, the script specifies one or more synchronization points for synchronizing execution of multiple instances of the script, the method comprising synchronizing the concurrent instances of the script at the synchronization point or points. In this way, multiple devices can be configured concurrently while still maintaining sequential control, so enabling a good balance between speed and reliability to be achieved.

The script preferably specifies a synchronization point dividing the instruction sequence into a first instruction block and a second instruction block, each instruction block comprising zero or more instructions, the method comprising: executing, in a first executing instance of the script, the first instruction block; and executing, in the first executing instance of the script, the second instruction block only after a second executing instance of the script has executed the first instruction block, to thereby synchronize execution of the first and second script instances at the synchronization point. This can allow configuration operations on different devices to be performed in a desired sequence where necessary.

The method preferably comprises executing, in the first executing instance of the script, the second instruction block only after all other executing instances of the script have executed the first instruction block, to thereby synchronize execution of all executing script instances at the synchronization point. In this way, a simple synchronization mechanism can be provided which does not limit all instructions to be strictly sequenced but can allow concurrent processing where possible and sequencing only where necessary. This can be achieved without the need for the script author to code complex synchronisation procedures manually.

The script may specify multiple synchronization points, in which case the method preferably comprises synchronizing execution of the script instances at each synchronization point.

The instruction sequence may comprise one or more synchronization instructions specifying one or more synchronisation points at which multiple concurrent script instances are to be synchronised.

Alternatively, the synchronization points may be specified in any other suitable way, for example using an index, pointer, instruction reference, marker or keyword.

The at least two devices may each be associated with a device type, in which case the script may specify a first sequence of configuration instructions associated with a first device type and a second sequence of configuration instructions associated with a second device type. Executing an instance of the script for a given device may then comprise selecting one of the first and second instruction sequences in dependence on the device type of the given device, and executing the selected instruction sequence.

In this way, more complex configuration processes can be specified, thus providing greater flexibility. Devices may be associated with types in dependence on the roles which they perform within a service. Thus, executing an instance of the script for a given device may comprise selecting one of the first and second instruction sequences in dependence on a role associated with the given device. Other type classifications may alternatively or additionally be used, for example classifications by device manufacturer, device class, software version, hardware version or model. Different type classifications may also be combined. In certain embodiments described in more detail below, a role-based approach is used.

Each of the first and second instruction sequences may comprise one or more corresponding synchronization points, the method comprising synchronizing a first instance of the script for which the first instruction sequence is being executed with a second instance of the script for which the second instruction sequence is being executed using the specified corresponding synchronization point or points.

Thus, a first instruction sequence may comprise one or more synchronisation points, and a second instruction sequence may comprise one or more synchronisation points each corresponding to one of the one or more synchronisation points of the first instruction sequence. This can provide even greater flexibility in defining complex configuration processes. Synchronization points in different instruction sequences may be identified as corresponding by way of matching synchronisation point identifiers (such as numbers or labels), or simply by the order of synchronisation points (e.g., the third specified synchronisation point in one instruction sequence may be considered to correspond to the third specified synchronisation point in another instruction sequence).

The method may further comprise, for a sequence of configuration instructions or corresponding sequences of configuration instructions not having associated synchronisation points or corresponding synchronisation points, executing the instruction sequence or corresponding instruction sequences in multiple concurrent instances of the configuration script independently of each other. This can provide greater efficiency. In this context, "independent execution" preferably means asynchronous execution, i.e. execution of instances without synchronisation (in time). Thus, except where specified otherwise by synchronisation points, each instance preferably executes at its own speed.

Preferably, the method further comprises storing a plurality of configuration scripts, each defining configuration operations for a respective service type, receiving a configuration request specifying a service to be provided, selecting one of the plurality of stored configuration scripts in dependence on the specified service, and executing the selected configuration script to configure the network to provide the specified service. This can enable efficient provisioning of services.

The configuration request may specify one or more devices to be used to provide the service, and the method may comprise executing an instance of the selected configuration script for each device specified in the configuration request to configure the device. Thus, the script is preferably defined independently of the actual devices used to provision a given service (though the script may be specific to a class of devices and/or a service type or class), so that the same script can be re-used, preferably without requiring modification, to provision multiple services of the same service type (and using devices of the same or similar type). This can greatly simplify provisioning of new services, and can allow the provisioning process to be largely automated. In this sense, a configuration script acts as a device-independent template for specifying a configuration control process which includes the configuration operations needed to provision services of a given service type. In the detailed description of certain embodiments given below, configuration scripts are therefore also referred to as Control Templates.

The configuration request preferably specifies a device type associated with a device, the method comprising selecting one of a plurality of instruction sequences specified by the configuration script in dependence on the specified device type, and executing the selected instruction sequence in the script instance for the device. Alternatively, the device type may be inferred or otherwise derived.

The method preferably comprises creating a separate processing context for each executing script instance, and executing each script instance within the respective processing context. This can enable efficient and reliable concurrent execution. Multiple concurrent script instances may be executed as multiple concurrent threads, tasks or processes in a multi-threading, multi-tasking or multi-processing system, and/or may be executed by a virtual machine. The method preferably comprises signalling completion of the configuration script upon completion of all executing script instances.

The method set out above can allow for efficient provisioning of new services using configuration scripts. Alternatively or additionally, the method may be applied to the removal of existing services from the network.

The method may accordingly further comprise: receiving a configuration request specifying a service and an action indicator specifying whether a service is to be added or removed; retrieving a configuration script in dependence on the service type of the specified service, the configuration script specifying a first set of configuration instructions for configuring the network to provide a new service of the service type and a second set of configuration instructions for configuring the network to no longer provide a service of the specified type which is currently being provided; selecting one of the first and second sets of instructions in dependence on the action indicator; and executing the selected set of instructions to either add a new service or remove an existing service of the specified type. This can allow configuration operations for adding a service and operations for removing a service to be specified in the same script. This can improve user convenience and efficiency. The different sets of configuration instructions may each comprise synchronisation points and/or multiple instruction sequences for different devices/device types as set out above.

The method may alternatively or additionally comprise: receiving a configuration request specifying a service and an action indicator specifying a configuration action relating to the service; retrieving a configuration script in dependence on the service type of the specified service, the configuration script specifying at least a first set of configuration instructions for performing a first configuration action and a second set of configuration instructions for performing a second configuration action for a service of that type; selecting one of the first and second sets of instructions in dependence on the action indicator; and executing the selected set of instructions to perform the specified configuration action.

This feature may also be provided independently. Accordingly, in a further aspect of the invention, there is provided a method of configuring services in a telecommunications system, comprising: receiving a configuration request specifying a service and an action indicator specifying a configuration action relating to the service; retrieving a configuration script in dependence on the service type of the specified service, the configuration script specifying at least a first set of configuration instructions for performing a first configuration action and a second set of configuration instructions for performing a second configuration action for a service of that type; selecting one of the first and second sets of instructions in dependence on the action indicator; and executing the selected set of instructions to perform the specified configuration action. In this way, a more flexible configuration method can be provided.

The first, second and specified configuration actions are preferably selected from a group comprising: addition of a service, modification of an existing service, and removal of an existing service.

Preferably, the method of any of the above aspects comprises storing information defining a plurality of configuration operations, the configuration script comprising one or more configuration instructions each for invoking one of the stored configuration operations. Configuration operations may, for example, define basic configuration actions, each relating to a given type of device or networking equipment. The configuration script can then specify a configuration process in terms of the stored configuration operations. In this way, the configuration script can be expressed independently of low-level device details.

This can be useful, for example, where networking equipment is replaced or upgraded. The stored operations can then be modified in view of the change in equipment (for example, if the new equipment uses a different command set to achieve the required configuration actions), without requiring every configuration script referencing those operations to be changed.

For a given configuration operation, the stored information may define: at least two device-specific implementations of the configuration operation, each implementing the configuration operation for a different device type or model; and a device-independent interface usable for invoking each of the device-specific implementations of the configuration operation. This can allow configuration scripts to be expressed in a more device-independent manner. The interface may, for example, specify one or more configuration parameters required by the device-specific implementations of the configuration operation and/or a name or label for the configuration operation.

This feature is also provided independently. Accordingly, in a further aspect, the invention provides a method of configuring devices in a telecommunications network for a service, comprising storing information defining a plurality of configuration operations, the information defining for at least one of the configuration operations: at least two device-specific implementations of the configuration operation, each implementing the configuration operation for a different device type or model; and a device-independent interface usable for invoking each of the device-specific implementations of the configuration operation; the method further comprising executing a configuration script comprising one or more configuration instructions for invoking one or more of the stored configuration operations by way of the defined device-independent interfaces.

The configuration script may comprise one or more references to configuration operations; and executing the configuration script for a given device may comprise: identifying a reference to a configuration operation; selecting a device-specific implementation of the configuration operation in dependence on the given device; and executing the selected device-specific implementation of the configuration operation. Thus, a configuration script can be coded without knowledge of the devices ultimately used. The appropriate device-specific implementations of operations can be selected at the time of execution, allowing changes to be made to devices and to the device-specific implementations of operations without affecting configuration scripts already in use.

To provide additional flexibility, the configuration script may reference one or more configuration parameters, the method comprising receiving parameter values for the configuration parameters, and executing the configuration script using the received parameter values.

The method may comprise: receiving, for a parameter referenced in the configuration script, first and second parameter values; executing a first instance of the configuration script for a first device using the first parameter value; and executing a second instance of the configuration script for a second device using the second parameter value. In this way, different devices requiring different configuration parameters may be configured efficiently using the same script, further enhancing flexibility.

In a further aspect of the invention, there is provided a method of provisioning a service in a telecommunications network, comprising: receiving a configuration script comprising configuration instructions for configuring devices of the network to provide the service, the script including a first sequence of configuration instructions associated with a first device type and a second sequence of configuration instructions associated with a second device type; receiving information specifying a device to be used in providing the service, the device being associated with a device type; and selecting one of the first and second instruction sequences in dependence on the device type of the device, and executing the selected instruction sequence to configure the device. The information may specify a plurality of devices to be used in providing the service, the method comprising performing the selecting and executing steps for at least two and preferably each of the specified devices. This method may further comprise any of the features or steps of the previously described method.

In a further aspect of the invention, there is provided a method of performing a configuration action in a telecommunications system for a service involving a plurality of devices, comprising: receiving a configuration script specifying a sequence of configuration instructions for performing the configuration action for at least two of the plurality of devices; and concurrently executing an instance of the configuration script for each of the at least two devices to configure the at least two devices in accordance with the configuration action. The configuration action may be one of: addition of a service, modification of an existing service, and removal of an existing service. The configuration script may specify multiple sequences of configuration instructions for performing multiple different configuration actions.

In a further aspect, the invention provides a computer program or computer program product for configuring a telecommunications system to provide a service involving a plurality of devices, comprising software code adapted, when executed on a data processing apparatus, to perform the steps of: receiving a configuration script specifying a sequence of configuration instructions for configuring at least two of the plurality of devices to provide the service; and concurrently executing an instance of the configuration script for each of the at least two devices to configure the at least two devices to provide the service. The software code is preferably further adapted to perform a method as set out above.

In a further aspect, the invention provides a network management system or service provisioning system for configuring a telecommunications network to provide a service involving a plurality of devices, comprising: means for receiving a configuration script specifying a sequence of configuration instructions for configuring at least two of the plurality of devices to provide the service; and means for concurrently executing an instance of the configuration script for each of the at least two devices to configure the at least two devices to provide the service. The system preferably further comprises means for performing a method as set out above.

In a further aspect of the invention, there is provided a configuration script for configuring a telecommunications network for a service, the script specifying: a sequence of configuration instructions for configuring devices of the telecommunications network for the service; and one or more synchronisation points for synchronising multiple concurrent instances of the script.

The script may specify two or more sequences of configuration instructions, each instruction sequence being associated with a device type and comprising configuration instructions for configuring a device of that type for the service. At least two sequences of configuration instructions may each specify one or more corresponding synchronisation points for synchronising multiple concurrent instances of the script for which different ones of the at least two sequences of configuration instructions are being executed. A synchronisation point may be specified by way of a synchronisation instruction. Alternatively or additionally, an instruction sequence may be divided into two or more sub-sequences, the boundary or boundaries between sub-sequences forming one or more synchronisation points at which multiple concurrent instances of the script are to be synchronised. In this way, a sequence of configuration instructions can be divided into separate configuration steps, and multiple concurrent instances of the script can be synchronised on a step-by-step basis.

The configuration script may comprise multiple sections, each section comprising configuration instructions for performing a different configuration action, the configuration action preferably being one of: addition of a service, modification of an existing service, and removal of an existing service. The configuration script may be encoded as an XML document, and may include one or more script portions expressed in a scripting language, preferably JavaScript.

The invention also provides an XML schema or XML document type definition (DTD) specifying an XML document format for a configuration script as described herein or for a configuration operation as described herein.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale. Preferred features of the present invention will now be described, purely by way of example, with reference to the accompanying drawings, in which:—

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure. Reference is now made in detail to the exemplary embodiments of the invention, examples of which are illustrated in the accompanying drawings. Wherever possible, the same reference numbers will be used throughout the drawings to refer to the same or like parts (elements).

Figure 1:
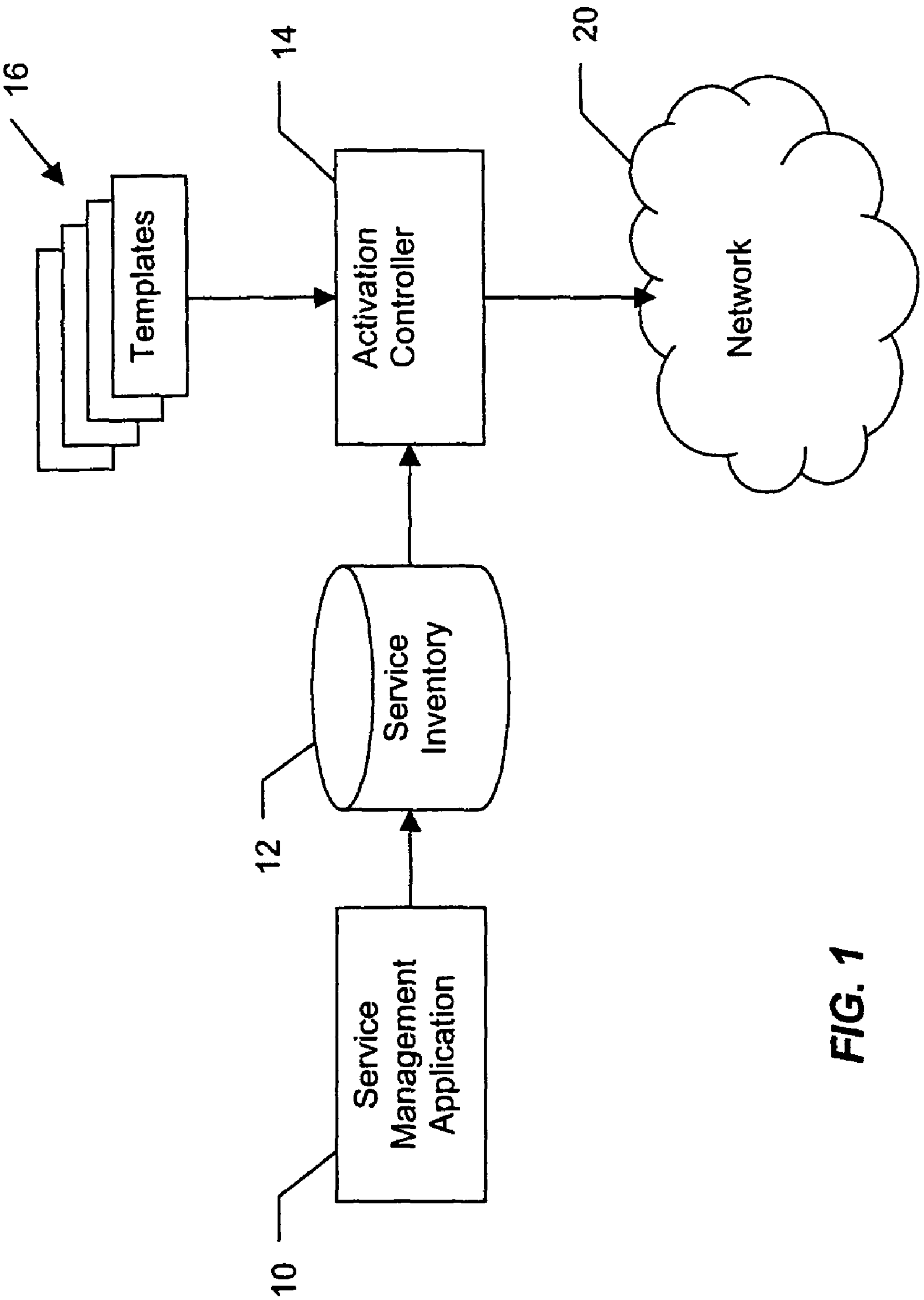
FIG. 1 shows a service management system for a telecommunications network in overview.

FIG. 1 illustrates a service management system for a telecommunications network in overview.

The system comprises a service inventory 12 storing information on services provided to users of network 20. Additionally, the inventory 12 preferably stores information on network resources of the network 20 in the form of a network model. Alternatively, the network model may be stored in a separate resource inventory. The inventory or inventories are typically stored in a database.

A service management application 10 interacts with the service inventory 12 and allows network services to be added and removed (for example, under control of an operator). In a typical example, an operator may use the service management application 10 to set up a new service for a user of the network (such as a new Internet access service). Under control of the service management application 10, network resources are identified in the inventory 12 for use in providing the new service, and the inventory is updated to reflect the new service. To translate the changes in the inventory into actual changes in the network, an activation request is generated, specifying the identified network resources (in particular network devices involved in providing the new service) and any set-up parameters.

The activation request is passed to an activation controller 14, which is responsible for implementing the changes in the network, in particular by configuring the devices specified in the activation request to provide the new service.

The activation controller maintains a queue of activation requests and may process these in order of receipt or in some other order, for example based on efficiency considerations. Each activation request may specify the addition, modification or removal of a service from the network, or the cancellation of a previously queued (but not yet implemented) activation request.

In the present example, where a new service is being added, the activation controller 14 carries out the configuration operations necessary to configure the specified devices to provide the new service.

The configuration operations are defined in configuration templates stored in a template library 16. Two types of templates are provided: Agent Templates and Control Templates.

Agent Templates define the basic configuration operations available for configuring devices. Typically, a given Agent Template is associated with a particular device type and performs a specific configuration operation on a device of that type. Control Templates are configuration scripts defining sequences of steps needed to configure complex services using the basic configuration operations defined in the Agent Templates.

A Control Template is defined for each service type that is to be provisioned in the network. Control Templates comprise sequences of configuration instructions. These most commonly take the form of Agent Template invocations, but other types of commands (including control structures such as “if/then/else”) may also be used.

The activation request specifies the service to be provisioned and the devices to be used in provisioning the service. The activation controller 14 identifies the Control Template associated with the given service and executes, for each device involved in the service, the configuration instructions specified by the template, in particular by invoking the Agent Templates specified in the Control Template.

The configuration instructions for the devices are generally executed in parallel. To achieve this, the activation controller 14 concurrently executes a separate instance of the Control Template for each device being configured, creating separate processing contexts for each instance of the control template, and hence for each device. These instances of the Control Template (CT) are referred to herein as CT Device Instances. Processing contexts may, for example, be in the form of processes, tasks or threads in a parallel processing, multi-tasking or multi-threaded operating system. Alternatively, the activation controller may provide a virtual machine (or similar control arrangement) and control execution of the templates within the virtual machine.

Invocation of Agent Templates results in specific configuration instructions being transmitted to the relevant devices in the network 20, thereby configuring the devices to provide the service. Configuring a device to provide a service is also referred to as activating the device for the service.

The activation controller preferably maintains a log of the configuration operations performed, and any error information generated. Preferably, a separate log is provided for each Control Template and/or for each activation request.

The controller 14 itself may, for example, be a standalone computer or a process executing on a network management server.

Activation Request

The activation request transmitted to the activation controller 14 may specify the following information:

- An Activation ID uniquely identifying the Activation Request
- The class and type of service being provisioned
- The control template(s) to be invoked to provision the service (the control template(s) may also be selected automatically based on the service type)
- Information on the devices to be used in provisioning the service (e.g. number of devices, device identifiers (Device ID) and device types)
- Service parameters, for example specifying service level or quality of service (QoS), service quantity e.g. bandwidth, or content selection (where e.g. a content delivery service is being provided)
- Any other configuration parameters to be used in configuring devices (e.g. port settings).

Figure 7:
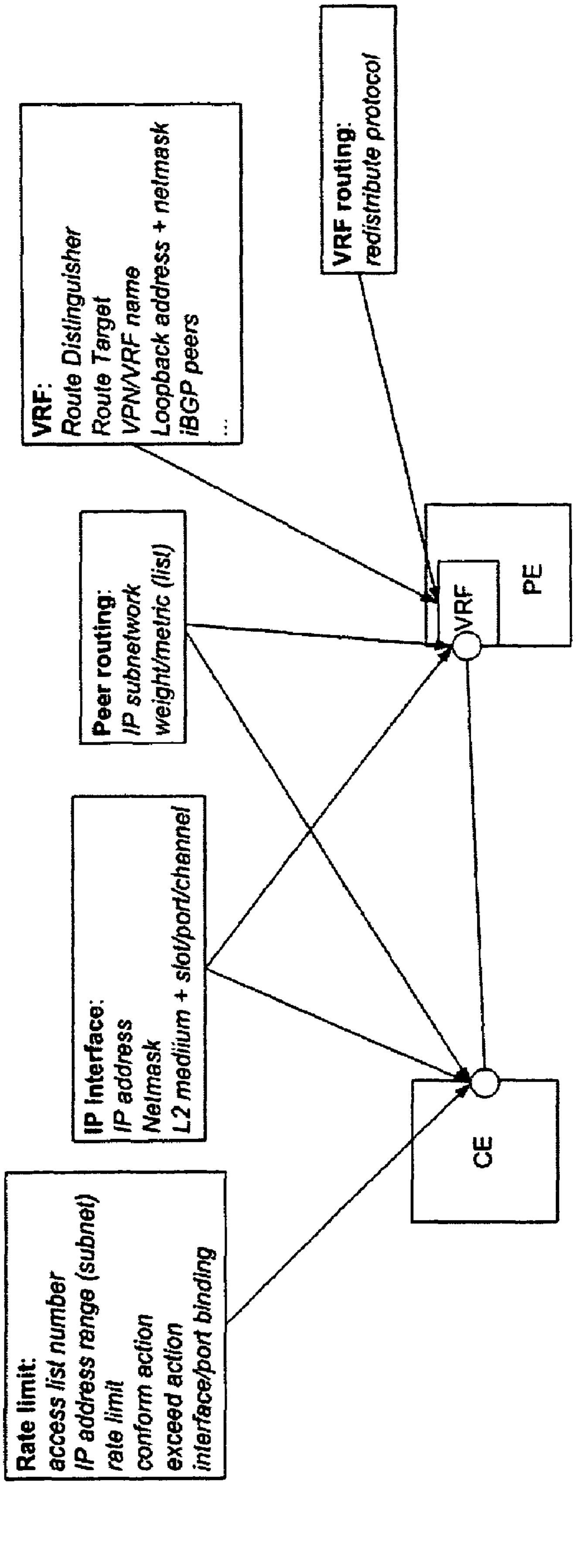
FIG. 7 illustrates a symmetric service example (VRF)

The activation information falls into two categories: design invariant information (DII) and design variant information (DVI). DII refers to information that is applicable to, and the same for, all devices involved in a service (such as service class or type, QoS or bandwidth requirements), and tends to describe the service as a whole. DVI refers to information which can vary across the service, for example:

- parameters that apply to some devices, but not others (for example VRF, VRF routing and Rate Limit parameters in the example of FIG. 7)
- parameters that can have different values for two or more devices. An example is the position of a service in the multiplex hierarchy of the underlying bearer, such as the VC (Virtual Circuit) number within a VP (Virtual Path) in ATM.

Where, as in the latter example, the activation request specifies multiple values for a parameter for different devices, the activation controller executes the multiple CT Device Instances of the Control Template for the relevant devices using the parameter values associated with each device.

As described in more detail later, an Activation Request may also be used to modify or remove an existing service. In addition to service information, device information and service/configuration parameters, the Activation Request thus typically also specifies the activation action to be performed (e.g. add service, modify service, remove service).

The Activation Request is preferably encoded as an XML document.

Control Templates

Control Templates provide the logical control flow that governs the network configuration process. In a simple form, a Control Template specifies a sequence of Agent Templates (AT) which, when invoked, configure the network in a sequential manner. Thus, the Agent Templates are invoked in the sequence specified by the Control Template. However, in preferred examples, the Control Templates use a scripting language that supports logical and control flow constructs to provide a sophisticated scripted control flow mechanism as described throughout this section.

Preferably, in addition to invoking Agent Templates, a Control Template may also invoke other Control Templates. By allowing for nested invocation of Control Templates, Control Templates can be modularised, and more powerful and flexible control structures can be used (such as recursion).

Service and configuration parameters specified in the Activation Request are passed as parameters to the Control Template. The Control template itself may pass these parameters to the Agent Templates being invoked as appropriate. The Control Template may also use the device identifiers that are received in the Activation Request to query the inventory 12 for further information that may not be passed with the Activation Request, such as information on device software versions.

Activation Request Instances

This section introduces the support infrastructure that the activation controller 14 provides for the processing of a Control Template. This infrastructure is used from the point that the controller begins processing an Activation Request to the point that it is completed. This process is outlined in FIG. 2.

When the controller receives an Activation Request (AR), the Control Template (CT) to use to process the inbound Activation Request is determined from the Control Template selection parameters that match the DII in the Activation Request. A new processing context is created on the controller within which all the processing of the Activation Request takes place. This processing context is referred to as the Activation Request Instance. The Activation Request Instance is in effect the container for the processing of the Control Template invoked by the Activation Request and represents a single instance of the invocation of the Control Template.

Multiple Activation Requests may also be processed in parallel, in which case an Activation Request Instance is created for each Activation Request, executing the appropriate Control Template for that Activation Request. These are usually executed in parallel and independently of each other.

Figure 2:
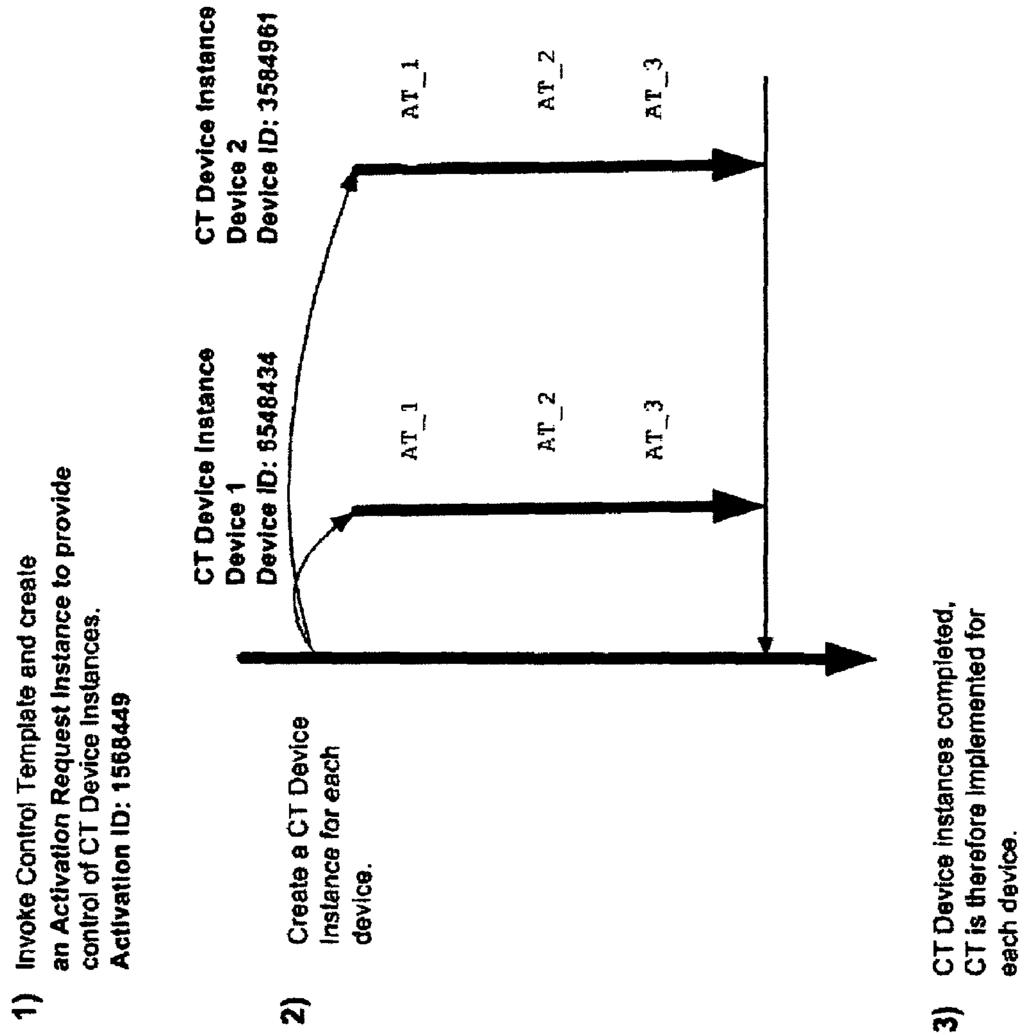
FIG. 2 illustrates a Control Template thread control structure

The creation of an Activation Request Instance is illustrated at step (1) in FIG. 2. Note that each Activation Request Instance is distinguished using the Activation ID of the Activation Request that caused it to be created.

Within each Activation Request Instance, a separate processing context is also created for each device that is being configured. This is illustrated in step (2). This processing context for a device is referred to as a Control Template (CT) Device Instance.

Each CT Device Instance controls the invocation of the Agent Templates specified in the Control Template on the device that the CT Device Instance is responsible for. The Activation Request Instance is responsible for coordinating the separate CT Device Instances.

Each CT Device Instance in operation in the system is identified by the Activation ID of its parent Activation Request Instance and the Device ID of the device that it is activating. This pair is used by the system in each log entry for the operations that are performed within a CT Device Instance.

When each CT Device Instance completes, it notifies the Activation Request Instance. When all CT Device Instances have completed execution, the execution of the Activation Request Instance is complete and the Controller may respond that the Activation Request has been processed; step (3) in FIG. 2. The Activation Request Instance can then be shut down.

Every Activation Request Instance will have an entry in the inventory and will also have a specific log file.

Where multiple Activation Requests are executed in parallel, conflict could occur between the corresponding Control Templates if these attempt to access the same device in the network, potentially resulting in incorrect configuration of devices, invalid configuration states or race conditions. To prevent this, the Activation Controller therefore preferably only allows one CT Device Instance to execute for any given device at any time. Thus, if a CT Device Instance is created for a given device which is already associated with an executing CT Device Instance (typically in a separate Activation Request Instance), then the Activation Controller suspends execution of the new CT Device Instance until the earlier one has terminated.

Control Template Operational Requirements

An Activation Request Instance is responsible for controlling the overall flow of activation for all the network elements (devices) included in the Activation Request that triggers its invocation. This process of control is not the same in all cases. For certain services and connections, the same basic operations will need to be performed at the same time. For others, there may need to be a certain order in which the operations are performed on the devices in the service.

This section describes the four operational behaviours provided by the controller to allow complex control of the activation process:

Asynchronous operation

Lock-stepped (synchronous) operation

Asymmetric operation

Asymmetric lock-stepped (synchronous) operation.

The following sections outline what each of these behaviours (or operating modes) requires the Controller to do.

Asynchronous Operation

Asynchronous operation permits each CT Device Instance to complete at its own speed—the CT Device Instance can invoke the next Agent Template in the Control Template as soon as the last one has completed. The Activation Request Instance simply waits for each CT Device Instance to complete before sending a success response for the Activation Request.

Asynchronous mode is used in cases where the same operations need to be performed on each device (though possibly with different configuration parameters). The operation of an Activation Request Instance and associated CT Device Instances in asynchronous mode is illustrated in FIG. 3.

Figure 3:
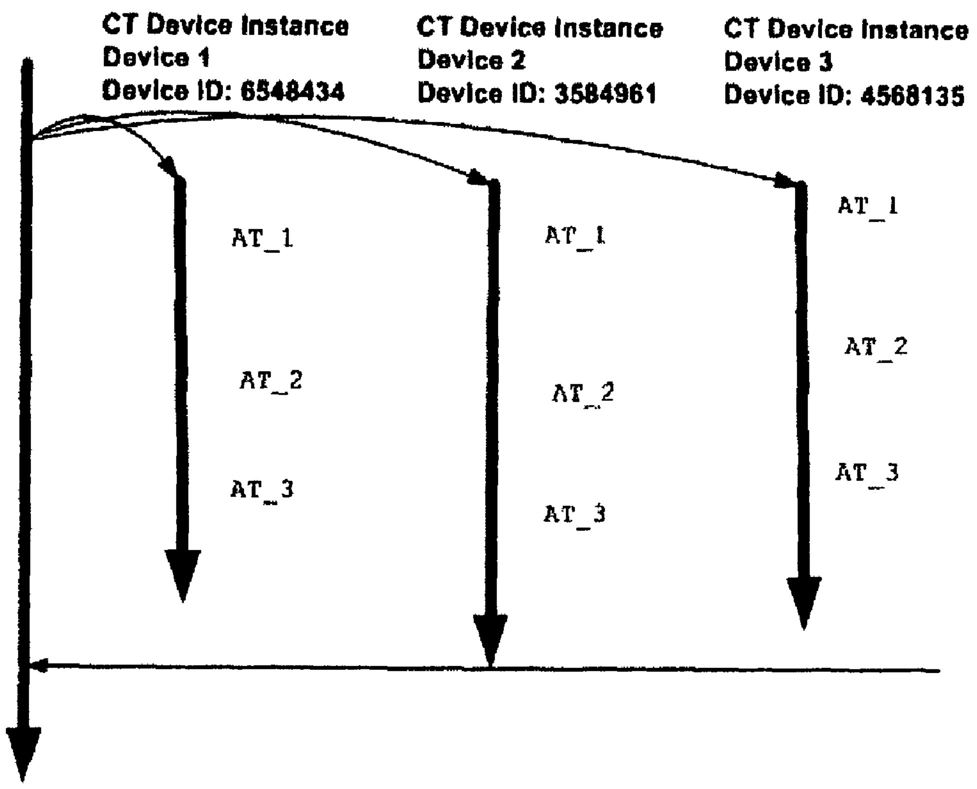
FIG. 3 illustrates asynchronous Control Template operation

The right-hand portion of FIG. 3 shows part of an Activation Request, in the form of an XML fragment defining devices for use in a service (here "device 1", "device 2" and "device 3"). Also shown (in pseudo-code) is the Control Template for the service, defining the steps needed to configure devices to provide the service. Specifically, the Control Template "ADD CT_Service" specifies three Agent Templates, "AT_1", "AT_2" and "AT_3"; a device being configured by executing the Agent Templates in the specified order for that device.

The left-hand portion of FIG. 3 illustrates execution of the Control Template for the defined devices. One CT Device Instance is created for each of devices "device 1", "device 2" and "device 3", identified by the Device ID of the respective device. Each CT Device Instance then executes the sequence of Agent Templates specified in the Control Template in parallel, independently of the other CT Device Instances. The sequence is the same for each CT Device Instance, but the instances are not synchronized, executing and completing at their own pace. Once the last CT Device Instance has finished executing (here "device 2"), the Control Template terminates.

Lock-Stepped (Synchronous) Mode

Lock-stepped operation provides for synchronization between CT Device Instances and can, for example, be used when a service is being created that requires certain configuration steps to be completed on all devices before the next configuration steps can be performed. It also permits services that require configuration to be carried out step-wise at either end of a connection to be created in strict order.

An example of this is where an IP service is to be created on top of an MPLS tunnel. The Control Template may provide the configuration instructions for setting up both the MPLS tunnel and, subsequently, the IP service. However, before configuring the IP service on the router devices, the Control Template may specify that there must be a CHECK operation performed on the router to ensure that the tunnel has been correctly installed.

There may be other control-related reasons why synchronised operation is desirable. When creating a service in the network, it may be desirable for both or all endpoint devices to start up at once in a controlled manner, rather than being activated in a piecemeal manner.

Figure 4:
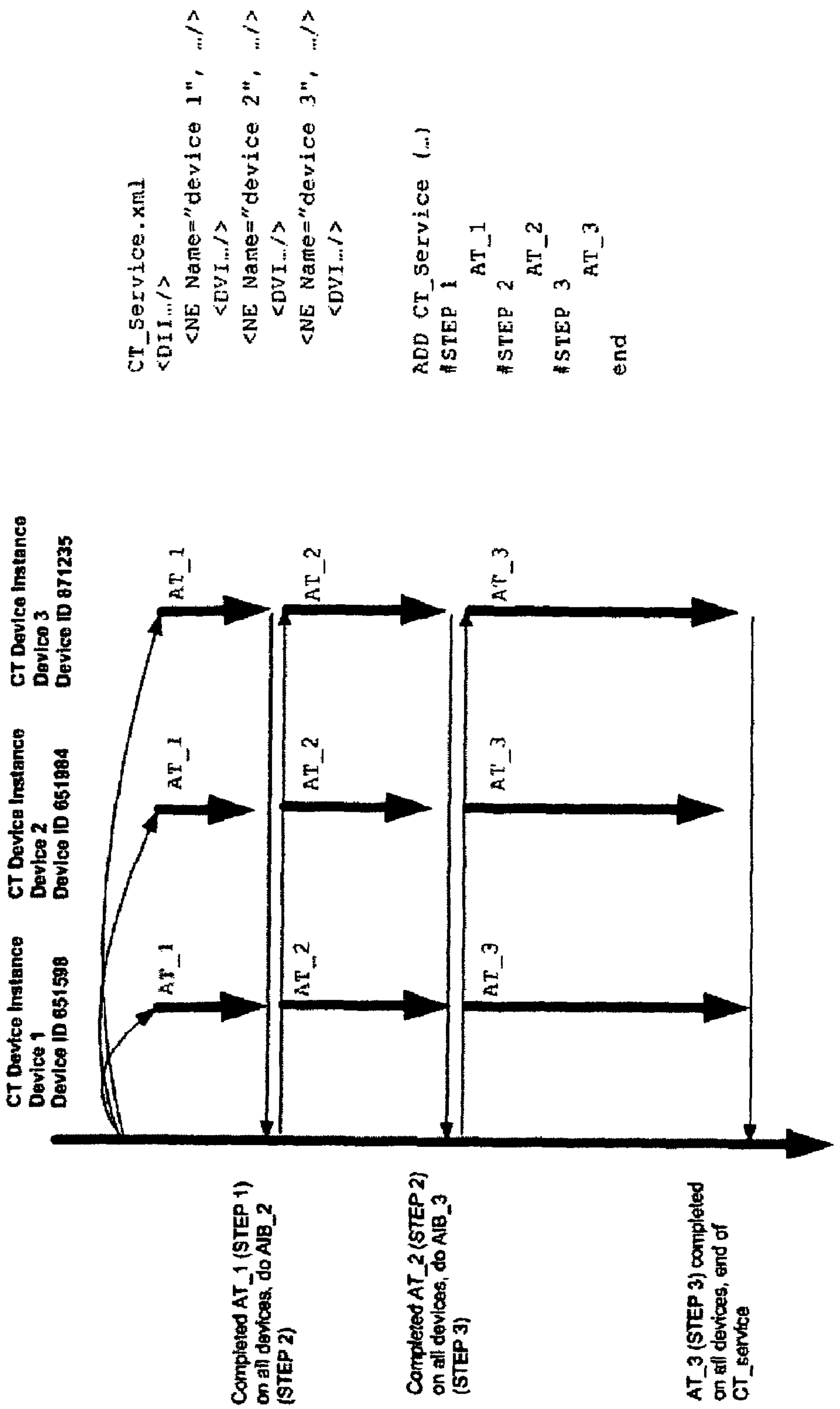
FIG. 4 illustrates lock-stepped Control Template operation

In lock-stepped mode, the configuration instructions (typically invoking Agent Templates) in a Control Template are grouped into instruction blocks referred to as "steps". Each step defines a sub-sequence of configuration instructions, which should be completed across all CT Device Instances before the next instruction block or step can be processed. This is illustrated in FIG. 4.

The right-hand side of FIG. 4 again shows an XML fragment defining the devices for a service, and the Control Template itself. In this example, the Control Template is divided into a number of steps using a "#STEP" control command with a numerical step identifier. Each step has to be completed for all CT Device Instances in the Activation Request Instance (i.e. for all devices in the service) before the next step can be started, as shown in the main diagram of FIG. 4.

Here, each step specifies only a single AT. However, a step may also specify more than one AT (or other instructions) or may be empty (i.e. specifying no ATs/instructions).

The "#STEP" commands in the Control Template thus serve to define synchronization points in the control template. Multiple concurrent CT Device Instances of the Control Template are synchronized at the specified synchronization points so that each only executes instructions after the synchronization point once all others have completed executing instructions before that synchronization point.

Asymmetric Operation

In the above examples, the same instructions are performed for each device (either asynchronously or synchronously). However, not all device activations require the same operations to be performed on all the devices that are being activated. Instead, in some cases, different device types may require their own activation sequences. This type of activation is referred to as asymmetric activation.

An example of a service which may require asymmetric activation is a service for providing user access to an authenticated server. The user end of the connection to the server will typically need some basic configuration to be applied to provide connectivity to the server. At the server end, similar configuration will typically be needed; however, additional configuration may be required to add the user's details to the authentication configuration of the server.

In asymmetric activation, different operations can be specified for two or more devices that are included in a service design. The Control Template that is invoked to implement this service then selects and performs the appropriate actions on each device.

Figure 5:
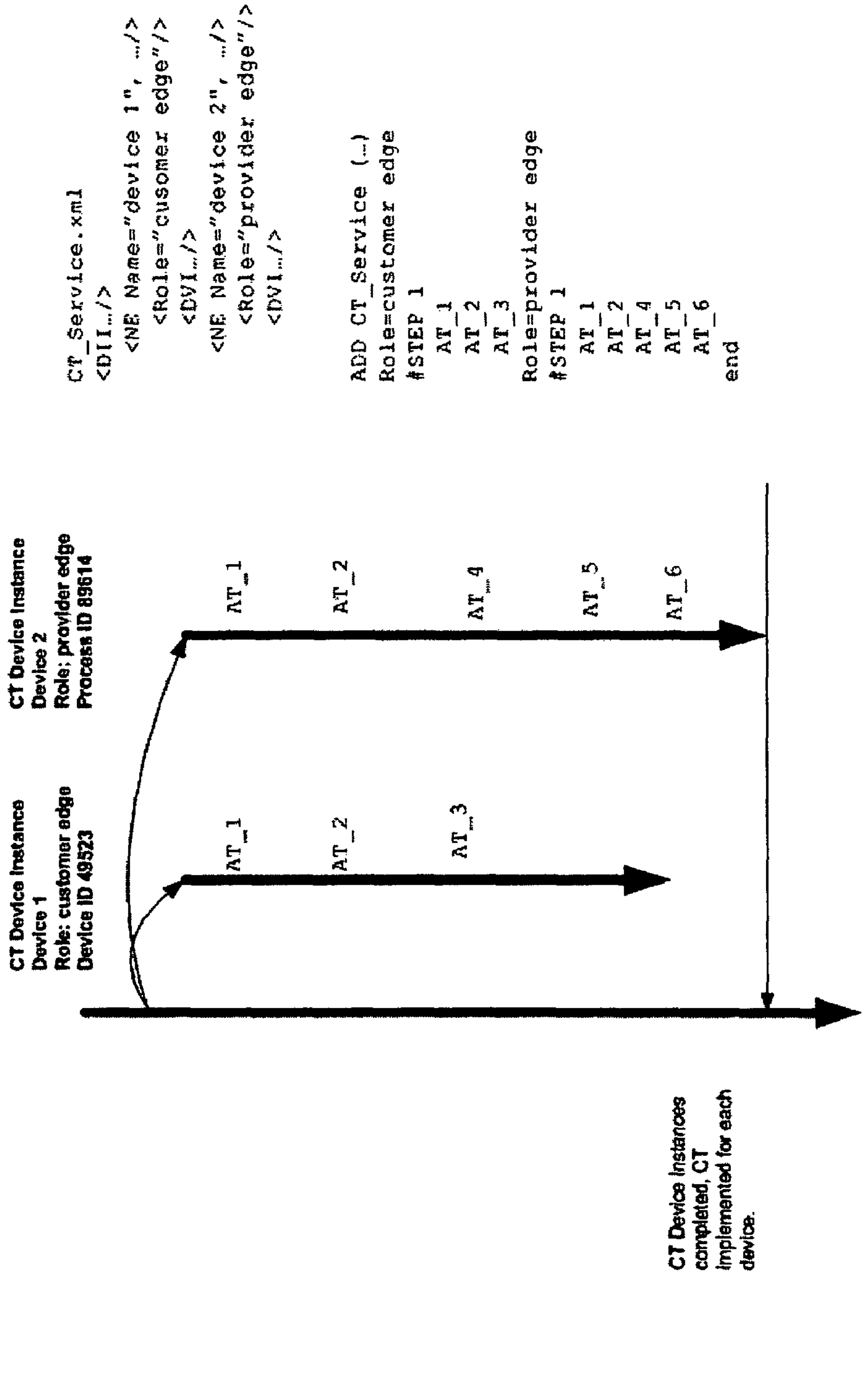
FIG. 5 illustrates basic asymmetric operation

Asymmetric mode is illustrated in FIG. 5.

Here, devices are classified into types based on their function within the service. The types are referred to as "Roles". The Control Template specifies different instruction sequences for each Role (i.e., different sequences of Agent Templates to be invoked). Within each Role, instruction sequences may be divided into synchronized blocks as described above (e.g. using the STEP control structure).

FIG. 5 again shows an XML fragment defining devices involved in a service. Here, however, each device is assigned a "Role" value (in this example, "customer edge" and "provider edge" respectively). The Control Template itself specifies different activation sequences for each Role used in the service.

The main diagram of FIG. 5 illustrates execution of the Control Template using the specified devices. For each CT Device Instance, the correct activation sequence is selected and executed by matching the Role defined for the device to the Roles specified in the control template. Thus, in this example, for CT Device Instance "Device 1", which has the "customer edge" Role, the first sequence defined in the Control Template ("AT_1, AT_2, AT_3") is executed. For "Device 2", having the "provider edge" Role, the second sequence is executed ("AT_1", "AT_2", "AT_4", "AT_5", "AT_6").

Within the Control Template, activation sequences for each role are identified using an appropriate syntax, here "Role=" followed by a Role identifier.

Asymmetric Lock-Stepped

Figure 6:
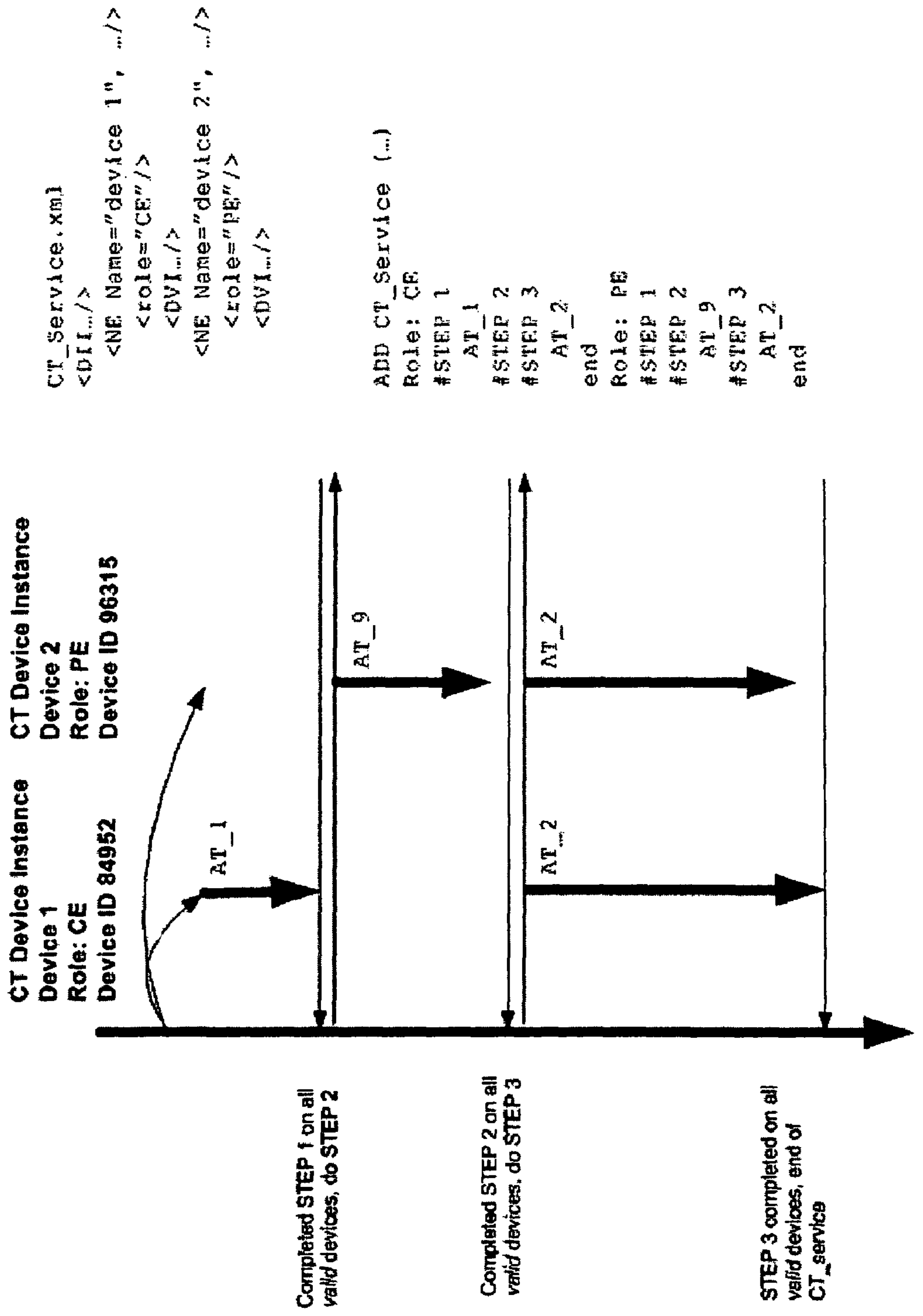
FIG. 6 illustrates asymmetric lock-stepped operation

Asymmetric activation may be combined with lock-stepped operation (synchronized operation) as described above to allow complex activation processes to be defined in which different devices require different activation sequences (i.e. activation is asymmetric), but some form of synchronization is nevertheless required between those different activation sequences. An example is shown in FIG. 6.

In this scenario, different devices need to be activated using a different set of commands to implement a single service. Further, there is a strict order in which this should happen. In the example in FIG. 6, Device 1 must have AT_1 called on it before device 2 has AT_9 called on it. Once these steps have completed, then both devices must have AT_2 called on them.

Thus, the Activation Request is implemented in a different manner by two or more devices providing the service.

This example makes use of both the Role and the Step concept that were introduced in the previous examples, roles being used to distinguish between different device types and specify different activation sequences for each device type, and steps being used to specify synchronization points for synchronizing execution of the CT device instances for the devices. Thus, synchronization can be achieved even between the different activation sequences defined for different device roles or types. A step may not specify any activation commands at all (i.e. an empty step can be specified)—this can be used, for example, where activation of one device needs to wait until other devices have reached a certain activation state.

To achieve synchronisation across the different instruction sequences specified in the Control Template for different device roles/types, corresponding synchronisation points (steps) should preferably be defined in each of the different instruction sequences. The corresponding synchronisation points may, for example, be identified by way of a step identifier, or simply by way of the order in which the steps are specified.

Detailed Example

The “Roles” and “Steps” constructs will now be described in more detail in the context of a specific example of an asymmetric service activation.

In this example, the service being activated is an MPLS (Multi-Protocol Label Switching) VPN (Virtual Private Network) service. The service involves two devices (CE=customer edge and PE=provider edge), each performing a different role in the service.

The ADD Activation Request may include the router ID of the CE and PE device, the IP addresses and netmasks for the creation of IP interfaces on each device, the parameters for a rate-limit service on the CE device and the VRF (Virtual Routing and Forwarding table) configuration parameters on the PE device.

The group of AT calls and the parameters needed for each call are represented in the diagram in FIG. 7. The CE device requires the following AT calls:

IP Address
Rate Limit
Peer Routing

The PE devices in contrast requires the following to implement its end of the VPN service:

VRF Creation
VRF Routing
IP interface
Peer routing

The service outlined in FIG. 7 is augmented by the addition of a Management VPN and can be encoded into a Control Template as outlined in the pseudo-code example below:

```
<AR>
<Device = CE>
  <Role = CE/>
    <DVI ... />
</Device>
<Device = PE>
  <Role = PE/>
    <DVI ... />
</Device>
</AR>
CT__Make__Vpn__Leg
ADD
  Role = PE
    #STEP 1
//make interface on CE for mgmt VPN
```

-continued

```
    #STEP 2
// create management VPN first
      CREATE At__Vrf
      CREATE At__Vrf__Routing
      CREATE At__Ip__Interface
      CREATE At__Peer__Routing
    #STEP 3
//make interface on CE for cust VPN
    #STEP 4
//now do customer VPN
      CREATE At__Vrf
      CREATE At__Vrf__Routing
      CREATE At__Ip__Interface
      CREATE At__Peer__Routing
  Role = CE
    #STEP 1
//make interface on CE for mgmt VPN
      CREATE At__Ip__Interface
      CREATE At__Rate__Limit
      CREATE At__Peer__Routing
    #STEP 2
//now make mgmt VPN on PE
    #STEP 3
//now make interface on CE for cust VPN
      CREATE At__Ip__Interface
      CREATE At__Rate__Limit
      CREATE At__Peer__Routing
    #STEP 4
//now make cust VPN on PE
end
```

In this example, the CE and the PE devices need different configuration. This is provided for using the Role construct. The CE device is configured by the list of Agent Templates under the “Role=CE” section of the Control Template. The PE is configured by the “Role=PE” section of the same Control Template.

Thus, both devices receive the correct set of AT invocations for their role in the network. However in both cases, the same Control Template has been used.

In this example, a management VPN is created before the customer service VPN. What this means is that two MPLS VPN VRFs are created on the PE. The management VPN is used to maintain reachability to the CE device once it has been put in the customer service VPN. Hence, the management VPN should typically be installed first. Then the customer VPN can be created without the CE being unreachable to the Agent that controls it.

Where roles are used, each Control Template should preferably have at least one Role section specified though there is no upper limit.

The Control Template may have a DEFAULT Role specified that describes what operation to take if no match for a Role section in the CT can be found to the Role of a device specified in the Activation Request.

In this example, the Agent Templates are invoked using a “CREATE [AT_Name]” command, in which AT_Name represents the name of the Agent Template to be invoked.

Steps are used in the Control Template to synchronize Agent Template invocations. Generally speaking, Control Templates may contain as many STEPs as are deemed necessary.

In preferred implementations, all the ATs (and nested CTs) in a STEP must complete before the Controller can begin processing the next STEP, under the control of the Activation Request Instance. Each CT Device Instance reports back to the Activation Request Instance when it has completed each STEP.

In the above detailed example, this means that STEPs 1 and 2 containing the management VPN AT invocations must complete before STEPs 3 and 4 containing the customer VPN AT invocations can be started.

Note also that the IP interface on the CE device should be added before the VPN is created on the PE, so there is CE interface configuration performed in each odd STEP, before the corresponding VRF is created in each even STEP.

To achieve fully asynchronous operation, the CT designer need only include a single STEP, followed by the list of Agent Templates to call.

To achieve fully lock-stepped (synchronous) operation, the CT designer may specify as many STEPs as there are Agent Template calls, so that each STEP contains a single Agent Template invocation.

In preferred implementations, STEPs extend across all Roles in the Control Template. As a consequence, each Role section in the Control template should preferably contain the same number of STEPs. In this way, asymmetric lock-stepped operation can be achieved. The CT mini-example on the right side of FIG. 6 illustrates this point. If a different number of STEPs is permitted, one device Role in a CT might complete while other Roles still have STEPs to complete—this would make controlling the ordered delivery of ATs more difficult (though a suitable control behaviour could be defined to accommodate this scenario).

As the example shows, it is permissible for a STEP to contain no ATs or nested CTs (or other instructions). If an empty STEP is specified for a device role, configuration of the device simply pauses until the step has been completed across all devices. This can be useful where devices need to be in a certain state before configuration of other devices can continue. On the other hand, where configuration actions on two devices can safely proceed independently of each other, these actions can be specified in the same STEP.

Invocation Command Sections

In a preferred implementation, the Controller interface permits a Control Template to be invoked with an ADD, DELETE or CANCEL command in an Activation Request. An ADD command is used to configure devices to create a new service. A DELETE command is used to configure devices to remove an existing service. The CANCEL command removes an unprocessed Activation Request from the Controller message queue. Optionally, a MODIFY command may also be provided to allow an existing service to be reconfigured.

Control Templates can preferably include separate ADD, DELETE and MODIFY sections, defining the configuration steps needed to add, delete or modify a service respectively, since these commands will typically require different operations to be performed on the devices referred to in the Activation Request. The CANCEL command typically need not be further specified in the Control Template since it typically does not require any service-specific actions.

The ADD section is used each time the Control Template is invoked with the ADD command. Each Agent Template listed in this section will be paired with the appropriate Agent Template invocation command for the case where the service is being created (i.e. "CREATE AT_Name").

The DELETE section is used each time the Control Template is invoked with the DELETE command. Each Agent Template listed in this section will be invoked by the appropriate Agent Template invocation command for the case where the service is being deleted (i.e. "DELETE AT_Name").

The MODIFY section is used if the Control Template is invoked with the MODIFY command, and Agent Templates may accordingly also be invoked with a suitable MODIFY command. Alternatively, a modify section could perform DELETE and ADD actions to reconfigure the service as required.

Modification of a service may involve changes to service parameters, such as a change in service quality, quantity or content, or may involve rearranging the service, for example by changing a termination location (e.g. in response to a service user relocating to new premises). In preferred embodiments, the Control Template may allow different types of modification to be specified, for example as multiple MODIFY sections or using a wider range of modification commands. Alternatively, different types of service modification may be specified in separate Control Templates.

Agent Templates may themselves specify different configuration operations to be performed depending on whether an Agent Template is invoked with a CREATE, MODIFY or DELETE command.

In preferred implementations, Agent Template invocations return a value indicating success or failure, and may also return more detailed information using appropriate response codes (for example error codes).

Conditional Agent Template Selection

A Control Template provides a recipe of the ATs that need to be invoked to create a service (though as already mentioned, other commands may also be provided in addition to AT invocation). Simple activation operations can be performed by a simple ordered list of ATs. However, more complex services may require the Controller to make choices about which AT to use in a particular case. To allow more complex activation sequences to be encoded, Control Templates therefore preferably provide control structures such as "if/then/else", "switch" or loop constructs. For example, a Control Template may specify a conditional choice of which AT to invoke next based on DVI/DII passed to the Control Template in the Activation Request.

The following pseudo-code gives an example of how an "if/then" construct might be used in a Control Template:

```
if (port_type[n] = Ethernet)
then
  CREATE At_Port_Traffic_Shape
else if (port_type[n] = ATM)
then
  CREATE At_Port_Rate_Limit_CAR
else
  FAIL(Wrong port type)
Endif
```

In this example, the Control Template examines the type of card that is specified in the DVI of the device being configured. If it is an Ethernet port, then an AT that implements traffic shaping is invoked; if it is an ATM port, then an AT that implements CAR (Committed Access Rate) is used. If neither of these match, then an error code is returned. The error code may, for example, be written to the CT Device Instance log.

In the following pseudo-code example, a "switch" statement is used to choose the AT call to make to set the Layer 2 encapsulation on a router. If the card is an ATM1 Port Interface Card (PIC), then the card-level encapsulation setting AT is called. If the card is an ATM2 PIC, then the port-level encapsulation setting AT is called. If the card is any other type, then the wrong type of card has been included in the DVI and an error is logged and the Control Template exits.

```
Switch(atmCardType)
Case "atm 1 PIC"
  CREATE At_L2_Encapsulation_Card_Level
```

-continued

```
Case "atm2 PIC"
    CREATE At_L2_Encapsulation_Port_Level
Case "default"
    ERROR
End;
```

Other control structures, such as loops, may also be provided.

Agent Templates

As previously mentioned, configuration instructions in the Control Template usually take the form of Agent Template invocations. Agent Templates represent basic configuration operations, usually performed on a single device. Control Templates, by way of contrast, represent more complex configuration actions or processes, typically consisting of a number of basic configuration operations, and often involving multiple devices.

Typically, the same configuration operation may be performed on different device types or models in a different way—for example, different device models may use different command sets and syntax, or require a different sequence of configuration steps to achieve essentially the same result.

The system may therefore store a different implementation of a configuration operation for each type or model of device for which the operation is used. These device-specific implementations of an operation are referred to as device-specific Agent Templates (SATs).

To nevertheless allow Control Templates to remain relatively device-independent, the system preferably allows configuration operations to be referred to in a device-independent manner. This is achieved by way of device-independent "placeholders", referred to as generic Agent Templates (GATs).

Generic ATs provide an interface definition for a configuration operation. This can include a name or other label for the operation and/or any configuration parameters required for performing the configuration operation.

For each generic AT, one or more device-specific implementations of the AT are stored in the template library. These device-specific ATs conform to the interface definition provided by the generic AT, and specify the actual configuration commands required to perform the given configuration operation on a device of a certain type or model.

The interface definition provided by the generic ATs allows Control Templates to include references to ATs without specifying a particular device-specific implementation. The correct device-specific AT can then be selected during execution depending on the actual device being used.

For example, a Control Template may invoke an Agent Template using a reference to a generic AT "GAT_configure_router (P1, P2)" for performing a certain configuration task on a device of class "router", where P1 and P2 are configuration parameters. However, the network may use various different models of router, possibly made by different manufacturers and using different command sets for configuration. Different device-specific ATs corresponding to the generic AT may then be provided for each router model, for example "SAT_configure_router_model_A (P1, P2)" and "SAT_configure_router_model_B (P1, P2)", with the correct SAT being selected during execution of the Control Template.

Device-specific ATs may also define parameter conversion tables or rules for converting device-independent parameter values for given configuration parameters into device-specific parameter values suitable for a given device, and/or for formatting parameter values for the target device (for example by converting parameter values from a device-independent format into a device-specific format).

In some cases, a GAT may have just a single SAT associated with it, typically where only a single device model is available in the network for performing a given role or function.

Also, as an alternative to providing different device-specific ATs for different device types or models, in some cases a single device-specific AT may perform different actions depending on circumstances (e.g., depending on the target device model). This may, for example, be appropriate where the differences in configuration coding required are small (for example for different device models of the same device class from the same manufacturer).

In preferred implementations, the activation controller 14 replaces the generic AT references in the Control Template with calls to the correct device-specific ATs when creating a new CT Device Instance for a given device, based on the device information supplied in the activation request or on information obtained from the resource inventory using the device information supplied. In alternative implementations, the activation controller could determine the correct device-specific AT during execution of the CT Device Instance, at the point of invocation of the generic AT.

Thus, generic ATs can provide a greater degree of device independence, resulting in greater reusability of Control Templates.

The activation controller 14 preferably stores a library of the device-specific ATs, along with generic AT definitions linked to associated device-specific ATs, to allow the matching of device-specific ATs to generic ATs at run-time as well as offline checking of Control Templates.

Generic/Specific AT Example

This example GAT defines the common parameters for a given configuration operation (in the example the configuration of a Martini pseudo-wire connection across an MPLS network). The example is encoded in XML.

```
<NETWORK ELEMENT Value="..."> //DNS name of the device
  <PARAM Name="Vendor", Type="string", Value="..."/>
  <PARAM Name="Device Model", Type="string", Value="..."/>
  <PARAM Name="L2 Port Type", Type="text", Value="..."/>
  <PARAM Name="L2 VC-ID", Type="number", Value="..."/>
  <PARAM Name="Control-word", Type="BOOLEAN", Value="..."/>
  <PARAM Name="IP_Address", Type="number", Value="..."/>
  <PARAM Name="Card Type", Type="string", Value="..."/>
  <PARAM Name="slot", Type="number", Value="..."/>
  <PARAM Name="port", Type="number", Value="..."/>
  <PARAM Name="sub-interface", Type="number", Value="..."/>
  <PARAM Name="encapsulation", Type="text", Value="..."/>
  <PARAM Name="Peer-loopback", Type="number", Value="..."/>
</NETWORK ELEMENT>
```

An example of a corresponding device-specific AT is given below (in pseudo-code), and includes references to the configuration parameters specified by the GAT:

```
CREATE_SECTION
if L2 Port Type = Ethernet
then
    Port_Type = eth
else if L2 Port Type = Gigabit Ethernet
```

-continued

```
then
    Port__Type = ge
else
        Call Error__Response: "Invalid port type"
//form the commands for the Martini service.
Command__1 = "interface %S%N/%N.%N", <Port__Type>, <Slot>,
<port>, <subinterface>
Command__2 = "encapsulation %S", <encapsulaion>
Command__3 = "mpls 12transport route %S %S", <peer-
loopback>,
<L2 vc-id>
Command__4 = "exit"
Call Send__function (IP__Address, Command__1, Command__2,
Command__3, Command__4)
Device__Prompt = Device__Prompt__Table(Device ID)
***** IF TELNET ECHO TURNED ON ON AGENT      ******
if (Get__Output(Command__1, Command__2, Command__3, Command__4,
Device__Prompt) = TRUE)
then
        Call Succeed__Response
else
        Call Error__Response
endif
DELETE__SECTION
if L2 Port Type = Ethernet
then
    Port__Type = eth
else if L2 Port Type = Gigabit Ethernet
then
    Port__Type = ge
else
    Call Error__Response: "Invalid port type"
Command 1 = "no interface %S%N/%N.%N", <L2 Port Type>,
<Slot>,
<port>, <subinterface>
Call Send__function (Command__1)
Device__Prompt = Device__Prompt__Table(Device ID)
If (Get__Output(Command__1, Device__Prompt) = TRUE)
then
        Call Succeed__Response
else
        Call Error__Response
Endif
```

The example includes both a CREATE section and a DELETE section for performing different steps depending on whether a service is being added or removed.

The SAT includes code to construct configuration commands in the format required by a given device and to transmit these commands to the device.

Implementation of the Activation Controller

In preferred embodiments, the activation controller 14 is implemented as a Java application executing on a Java Virtual Machine and uses the multitasking capabilities of the Java Virtual Machine to provide the necessary concurrency for executing multiple CT Device Instances in parallel.

This is preferably achieved with a relatively small number of long-lived threads in the activation controller configured to spawn off activity in the Agent Templates and, having initiated an Agent Template, to move on to other tasks rather than wait for a response.

The solution is preferably event-driven, so that Agent Templates respond autonomously when complete. These events can initiate further activity in the activation controller. A background 'clean-up' activity can also be provided that identifies Agent Templates, or whole Activation Requests, which have failed to respond (based on criteria such as a time-out), and which then initiates an appropriate recovery or rollback procedure.

In preferred implementations, Agent Templates can also make use of parallelism. For example, if a number of devices can use one device-specific AT (if, for example, they are different instances of the same device type) then only one AT instance may be invoked and the AT instance then drives the multiple devices in parallel.

Template Library

In preferred implementations, control templates and agent templates (both generic and device-specific) are encoded and stored in the template library 16 as XML documents. Additionally, for each distinct device type, an XML document is preferably stored specifying how to communicate with devices of that type. This information is then used to transmit the configuration commands defined in the device-specific ATs to the devices.

Within the XML documents representing Control Templates and Agent Templates, JavaScript is used to provide for scripting and program control.

Templates are preferably designed for reuse, and different sets of templates can be defined for different environments. The templates used in a given deployment of the system can be modified and new templates can be added to reflect changes in deployed network resources and equipment.

To support the definition and use of the templates using XML, the system preferably provides XML schemas defining the document formats for the various types of template stored in the template library (e.g. Control Templates and Agent Templates), and optionally also for other types of information used by the system.

In one example, the following schemas may be provided:

Device_schema—used to describe communications processes for accessing devices

ServiceDelivery_schema—used to describe the device-specific Agent Templates including translation tables used, for example, to translate generic parameters to device-specific ones Service_schema—used to describe Control Templates and the generic Agent Templates Instead of schemas, DTDs (Document Type Definitions) could also be used.

Tools can be provided to support the management of the template library including, for example, the following functions:

XML/JavaScript editor for defining and modifying control templates and agent templates;

XML validator for validating XML documents against the appropriate schemas;

Compiler for compiling JavaScript into object code (which provides syntactic validation) and converting or formatting data from XML documents into a data format suitable for loading into the inventory and/or activation controller;

Packaging of compiled script, converted/formatted data and original XML content into JAR files to enable configuration management and reuse of the templates;

Deployment into activation controller.

It will be understood that the present invention has been described above purely by way of example, and modification of detail can be made within the scope of the invention.

What is claimed is:

1. A method of configuring a telecommunications system involving a plurality of telecommunication devices, comprising:

receiving a configuration request specifying a telecommunications service and an action indicator specifying whether the same telecommunications service is to be added to or removed from at least two of a plurality of telecommunication devices of a same type;

retrieving, utilizing a processor, a configuration script in dependence on a telecommunications service type of the specified telecommunications service, the configuration script specifying a first set of configuration instructions for configuring the at least two of the plurality of telecommunication devices of the same type to provide a new telecommunications service of the telecommunications service type such that the at least two of the plurality of telecommunication devices of the same type have the same telecommunications service added, a second set of configuration instructions for configuring the at least two of the plurality of telecommunication devices to remove a telecommunications service of the telecommunications service type which is currently being provided such that the at least two of the plurality of telecommunication devices of the same type have the same telecommunications service removed, and one or more synchronization points for synchronizing execution of multiple instances of the script;

selecting one of the first and second sets of configuration instructions in dependence on the action indicator;

concurrently executing the same selected set of configuration instructions of the configuration script for each of the at least two telecommunication devices of the same type to configure the at least two telecommunication devices of the same type, to either provide the new telecommunications service or remove the telecommunications service which is currently being provided, such that the at least two of the plurality of telecommunication devices of the same type have the same telecommunications service added utilizing the same selected set of configuration instructions, or the at least two of the plurality of telecommunication devices of the same type have the same telecommunications service removed utilizing the same selected set of configuration instructions; and synchronizing the concurrent instances of the script at the synchronization point or points.

2. A method according to claim 1, wherein the script specifies at least one synchronization point dividing each of the sets of configuration instructions into a first instruction block and a second instruction block, each instruction block comprising zero or more instructions, the method comprising:

executing, in a first executing instance of the script, the first instruction block of the selected set of configuration instructions; and executing, in the first executing instance of the script, the second instruction block of the selected set of configuration instructions only after a second executing instance of the script has executed the first instruction block, to thereby synchronize execution of the first and second script instances at the at least one synchronization point.

3. A method according to claim 2, comprising executing, in the first executing instance of the script, the second instruction block of the selected set of configuration instructions only after all other executing instances of the script have executed the first instruction block of the selected set of configuration instructions, to thereby synchronize execution of all executing script instances at the at least one synchronization point.

4. A method according to claim 2, wherein the script specifies multiple synchronization points, the method comprising synchronizing execution of the script instances at each synchronization point.

5. A method according to claim 1, wherein each set of the configuration instructions comprises one or more synchronization instructions specifying one or more synchronization points at which multiple concurrent script instances are to be synchronized.

6. A method according to claim 1, wherein each of the first and second sets of configuration instructions comprise one or more corresponding synchronization points, the method comprising synchronizing a first instance of the script for which the first set of configuration instructions is being executed with a second instance of the script for which the second set of configuration instructions is being executed using the specified corresponding synchronization point or points.

7. A method according to claim 1, comprising, for a set of configuration instructions or corresponding sets of configuration instructions not having associated synchronization points or corresponding synchronization points, executing the set of configuration instructions or corresponding sets of configuration instructions in multiple concurrent instances of the configuration script independently of each other.

8. A method according to claim 1, comprising storing a plurality of configuration scripts, each defining configuration operations for a respective telecommunications service type, receiving a configuration request specifying a telecommunications service to be provided by the at least two of the plurality of telecommunication devices of the same type, selecting one of the plurality of stored configuration scripts in dependence on the specified telecommunications service, and concurrently executing the selected configuration script for each of the at least two of the plurality of telecommunication devices to configure the network to provide the same specified telecommunications service.

9. A method according to claim 8, wherein the configuration request specifies the at least two of the plurality of telecommunication devices of the same type to be used to provide the same telecommunications service, the method comprising executing an instance of the selected configuration script for each telecommunication device specified in the configuration request to configure the at least two of the plurality of telecommunication devices.

10. A method according to claim 9, wherein the configuration request specifies a device type associated with the at least two of the plurality of telecommunication devices, the method comprising selecting one of the sets of configuration instructions specified by the configuration script in dependence on the specified device type, and executing the selected set of configuration instructions in the script instance for the at least two of the plurality of telecommunication devices.

11. A method according to claim 1, comprising creating a separate processing context for each executing script instance, and executing each script instance within the respective processing context.

12. A method according to claim 1, wherein multiple concurrent script instances are executed as multiple concurrent threads, tasks or processes in a multi-threading, multi-tasking or multi-processing system.

13. A method according to claim 1, wherein multiple concurrent script instances are executed by a virtual machine.

14. A method according to claim 1, comprising signaling completion of the configuration script upon completion of all executing script instances.

15. A method according to claim 1, comprising storing information defining a plurality of configuration operations, the configuration script comprising one or more configuration instructions for invoking one or more of the stored configuration operations.

16. A method according to claim 15, wherein, for a given configuration operation, the stored information defines:

at least two device-specific implementations of the configuration operation, each implementing the configuration operation for a different set of the at least two of the plurality of telecommunication devices; and a device-independent interface usable for invoking each of the device-specific implementations of the configuration operation.

17. A method according to claim 1, wherein the configuration script references one or more configuration parameters, the method comprising receiving parameter values for the configuration parameters, and executing the configuration script using the received parameter values.

18. A method according to claim 17, further comprising:

receiving, for a parameter referenced in the configuration script, first and second parameter values;

executing a first instance of the configuration script for a first set of at least two of the plurality of telecommunication devices of a first type using the first parameter value; and executing a second instance of the configuration script for a second set of at least two of the plurality of telecommunication devices of a second type using the second parameter value.

19. A method according to claim 1, wherein the configuration instructions are defined in a plurality of configuration templates stored in a template library, and each configuration template is one of an agent template that defines basic configuration instructions available for configuring the plurality of telecommunication devices, or a control template that includes a configuration script defining sequences of steps needed to configure complex telecommunications services using the basic configuration instructions defined in the agent templates.

20. A method according to claim 19, wherein each of the plurality of telecommunication devices are classified into at least one of a plurality of roles based on their function within the telecommunications service, and each of the control templates specifies different instruction sequences for each of the plurality of roles;

wherein an activation request specifies the plurality of telecommunication devices involved in providing the telecommunications service and any of a plurality of set-up parameters; and wherein each control template has a default role specified that describes what instruction to take if no match for a role section in the control template can be found to the role of a telecommunication device specified in the activation request.

21. A method according to claim 20, wherein telecommunications service and configuration parameters specified in the activation request are passed as parameters to the control template.

22. A method according to claim 1, wherein the type of the telecommunication devices includes a model of the telecommunication devices.

23. A method according to claim 1, wherein the type of the telecommunication devices includes a device manufacturer, device class, software version, hardware version, and model of the telecommunication devices.

24. A method of configuring telecommunications services in a telecommunications system, comprising:

receiving, utilizing a processor, a configuration request specifying a telecommunications service and an action indicator specifying a configuration action relating to whether the same telecommunications service is to be added to or removed from at least two of a plurality of telecommunication devices of a same type;

retrieving a configuration script in dependence on the telecommunications service type of the specified telecommunications service, the configuration script specifying at least a first set of configuration instructions for adding the same telecommunications service to the at least two of the plurality of telecommunication devices of the same type and a second set of configuration instructions for removing a telecommunications service from the at least two of the plurality of telecommunication devices of the same type;

selecting one of the first and second sets of instructions in dependence on the action indicator; and executing the selected set of instructions to perform the specified configuration action, such that the at least two of the plurality of the telecommunication devices of the same type have the same telecommunications service added utilizing the same set of configuration instructions, or the at least two of the plurality of telecommunication devices of the same type have the same telecommunications service removed utilizing the same selected set of configuration instructions;

wherein the sets of configuration instructions each specify one or more corresponding synchronization points for synchronizing multiple concurrent instances of the configuration script for which at least one different set of configuration instructions is being executed; where the concurrent instances of the configuration script are synchronized at the synchronization point or points.

25. A method of configuring telecommunication devices in a telecommunications network for a telecommunications service, comprising:

storing information defining a plurality of configuration operations, the information defining for at least one of the configuration operations:

at least two device-specific implementations of the configuration operation, each implementing the configuration operation for a different set of at least two of a plurality of telecommunication devices of a same type; and a device-independent interface usable for invoking each of the device-specific implementations of the configuration operation;

receiving a configuration request specifying a telecommunications service and an action indicator specifying whether the same telecommunications service is to be added to or removed from a set of at least two of a plurality of telecommunication devices of a same type;

retrieving a configuration script in dependence on a telecommunications service type of the specified telecommunications service, the configuration script specifying a first set of configuration instructions for invoking one or more of the stored configuration operations by way of the defined device-independent interfaces to add a new telecommunications service of the telecommunications service type such that the set of telecommunication devices of the same type have the same telecommunications service added, a second set of configuration instructions for invoking one or more of the stored configuration operations by way of the defined device-independent interfaces to remove the telecommunications service of the telecommunications service type which is currently being provided such that the set of telecommunication devices of the same type have the same telecommunications service removed, and one or more synchronization points for synchronizing execution of multiple instances of the script, where concurrent instances of the script are synchronized at the synchronization point or points;

selecting one of the first and second sets of configuration instructions in dependence on the action indicator; and executing, utilizing a processor, the selected set of instructions of the configuration script to either add the new telecommunications service or remove the existing telecommunications service of the telecommunications service type, such that the set of telecommunication devices of the same type have the same telecommunications service added utilizing the same selected set of configuration instructions, or the set of telecommunication devices of the same type have the same telecommunications service removed utilizing the same selected set of configuration instructions.

26. A method according to claim 25, wherein the configuration script comprises one or more references to configuration operations; and wherein executing the configuration script for a given set of at least two of the plurality of telecommunication devices of the same type comprises:

identifying a reference to a configuration operation;

selecting a device-specific implementation of the configuration operation in dependence on the given set of at least two telecommunication devices of the same type; and executing the selected device-specific implementation of the configuration operation for the given set of at least two telecommunication devices of the same type.

27. A method of provisioning a telecommunications service in a telecommunications network, comprising:

receiving, utilizing a processor, a configuration script comprising configuration instructions for configuring telecommunication devices of the network to provide the same telecommunications service, the script including a first sequence of configuration instructions associated with a first set of at least two of a plurality of telecommunication devices of a first type, a second sequence of configuration instructions associated with a second set of at least two of a plurality of telecommunication devices of a second type, and one or more synchronization points for synchronizing execution of multiple instances of the script, where concurrent instances of the script are synchronized at the synchronization point or points;

receiving information specifying a telecommunication device to be used in providing the telecommunications service, the specified telecommunication device being associated with the first device type or the second device type; and selecting one of the first and second instruction sequences in dependence on the device type of the specified telecommunication device such that if the first device type is specified then the first set of at least two telecommunication devices of the first type is selected, and if the second device type is specified then the second set of at least two telecommunication devices of the second type is selected, and executing the selected instruction sequence to configure the selected set of at least two telecommunication devices;

wherein the first and second sequences of configuration instructions each specify one or more corresponding synchronization points for synchronizing multiple concurrent instances of the configuration script for which different ones of the first and second sequences of configuration instructions are being executed.

28. A method according to claim 27, wherein the information specifies both of a telecommunication device of the first device type and a telecommunication device of the second device type to be used in providing the telecommunications service, the method comprising performing the selecting and executing steps for each of the first set of at least two telecommunication devices of the first type and the second set of at least two telecommunication devices of the second type.

29. A method of performing a configuration action in a telecommunications system for a telecommunications service involving a plurality of telecommunication devices, comprising:

receiving a configuration request specifying a telecommunications service and an action indicator specifying whether the same telecommunications service is to be added to or removed from at least two of a plurality of telecommunication devices of a same type;

retrieving, utilizing a processor, a configuration script in dependence on the telecommunications service type of the specified telecommunications service, the configuration script specifying a first set of configuration instructions for performing the configuration action for the at least two of the plurality of telecommunication devices of the same type to add a new telecommunications service of the telecommunications service type such that the at least two of the plurality of telecommunication devices of the same type have the same telecommunications service added, a second set of configuration instructions for performing the configuration action for the at least two of the plurality of telecommunication devices of the same type to remove a telecommunications service of the telecommunications service type which is currently being provided such that the at least two of the plurality of telecommunication devices of the same type have the same telecommunications service removed, and one or more synchronization points for synchronizing execution of multiple instances of the script;

selecting one of the first and second sets of instructions in dependence on the action indicator;

concurrently executing the same selected set of configuration instructions of the configuration script for each of the at least two telecommunication devices of the same type to configure the at least two telecommunication devices of the same type to either add a new telecommunications service or remove an existing telecommunications service of the telecommunications service type, in accordance with the configuration action, such that the at least two of the plurality of telecommunication devices of the same type have the same telecommunications service added utilizing the same selected set of configuration instructions, or the at least two of the plurality of telecommunication devices of the same type have the same telecommunications service removed utilizing the same selected set of configuration instructions; and synchronizing the concurrent instances of the script at the synchronization point or points.

30. A computer program product embodied on a non-transitory computer readable storage medium, for configuring a telecommunications system involving a plurality of telecommunication devices, comprising:

computer code for receiving a configuration request specifying a telecommunications service and an action indicator specifying whether the same telecommunications service is to be added to or removed from at least two of a plurality of telecommunication devices of a same type;

computer code for retrieving, utilizing a processor, a configuration script in dependence on a telecommunications service type of the specified telecommunications service, the configuration script specifying a first set of configuration instructions for configuring the at least two of the plurality of telecommunication devices of the same type to provide a new telecommunications service of the telecommunications service type such that the at least two of the plurality of telecommunication devices of the same type have the same telecommunications service added, a second set of configuration instructions for configuring the at least two of the plurality of telecommunication devices of the same type to remove a telecommunications service of the telecommunications service type which is currently being provided such that the at least two of the plurality of telecommunication devices of the same type have the same telecommunications service removed, and one or more synchronization points for synchronizing execution of multiple instances of the script;

computer code for selecting one of the first and second sets of configuration instructions in dependence on the action indicator;

computer code for concurrently executing the same selected set of configuration instructions of the configuration script for each of the at least two telecommunication devices to configure the at least two telecommunication devices to either provide the now telecommunications service or remove the telecommunications service which is currently being provided, such that the at least two of the plurality of telecommunication devices of the same type have the same telecommunications service added utilizing the same selected set of configuration instructions, or the at least two of the plurality of telecommunication devices of the same type have the same telecommunications service removed utilizing the same selected set of configuration instructions; and computer code for synchronizing the concurrent instances of the script at the synchronization point or points.

31. A configuration script embodied on a non-transitory computer readable medium for configuring a telecommunications network for a telecommunications service, the script specifying:

a sequence of configuration instructions for configuring at least two of a plurality of telecommunication devices of a same type of the telecommunication network for the same telecommunications service; and one or more synchronization points for synchronizing multiple concurrent instances of the script, such that an instance of the script is executed for each of the at least two telecommunication devices of the same type to configure the at least two telecommunication devices of the same type;

wherein the sequence of configuration instructions is divided into two or more sub-sequences, the boundary or boundaries between sub-sequences forming one or more synchronization points at which multiple concurrent instances of the script are to be synchronized;

wherein the script specifies two or more sequences of configuration instructions, each instruction sequence being associated with a telecommunication device type and comprising configuration instructions for configuring at least two of a plurality of telecommunication devices of that type for the telecommunications service;

wherein at least two sequences of configuration instructions each specify one or more corresponding synchronization points for synchronizing the multiple concurrent instance of the script for which different ones of the at least two sequences of configuration instructions are being executed.

32. A configuration script according to claim 31, wherein a synchronization point is specified by way of a synchronization instruction.

33. A configuration script according to claim 31, comprising multiple sections, each section comprising configuration instructions for performing a different configuration action, the configuration action including at least one of: addition of a telecommunications service, modification of an existing telecommunications service, and removal of an existing telecommunications service.

34. A configuration script according to claim 31, encoded as a XML document.

35. A network management system for configuring a telecommunications network involving a plurality of telecommunication devices, comprising:

an input component that receives a configuration script specifying: a first sequence of configuration instructions for configuring at least two of the plurality of telecommunication devices of a same type to provide a new telecommunications service of a telecommunications service type and a second sequence of configuration instructions for configuring the at least two of the plurality of telecommunication devices of the same type to no longer provide a telecommunications service of the telecommunications service type which is currently being provided; and one or more synchronization points dividing each of the sequences of configuration instructions into a first instruction block and a second instruction block, each instruction block comprising zero or more instructions, for synchronizing execution of multiple instances of the script;

an execution component including a hardware processor that:

receives a configuration request specifying a telecommunications service and an action indicator specifying whether the same telecommunications service is to be added to or removed from the at least two of the plurality of telecommunication devices of the same type;

selects one of the first and second sequences of configuration instructions in dependence on the action indicator;

concurrently execute an instance of the same selected sequence of configuration instructions for each of the at least two telecommunication devices of the same type to either add a new telecommunications service or remove an existing telecommunications service of the telecommunications service type, such that the at least two of the plurality of telecommunication devices of the same type have the same telecommunications service added utilizing the same selected set of configuration instructions, or the at least two of the plurality of telecommunication devices of the same type have the same telecommunications service removed utilizing the same selected set of configuration instructions; and synchronizes the concurrent instances of the script at the synchronization point or points;

wherein the execution component executes, in a first executing instance of the selected sequence of configuration instructions the first instruction block; and executes, in the first executing instance of the selected sequence of configuration instructions, the second instruction block only after a second executing instance of the selected sequence of configuration instructions has executed the first instruction block, to thereby synchronize execution of the first and second instances of the selected sequence of configuration instructions at the synchronization point.

36. A computer program product embodied on a non-transitory computer readable medium for configuring a telecommunications system involving a plurality of telecommunication devices, comprising:

computer code for receiving a configuration request specifying a telecommunications service and an action indicator specifying whether a same telecommunications service is to be added to or removed from at least two of a plurality of telecommunication devices of a same type;

computer code for retrieving a configuration script in dependence on a telecommunications service type of the specified telecommunications service, the configuration script specifying a first set of configuration instructions for configuring the at least two of the plurality of telecommunication devices of the same type to provide a new telecommunications service of the telecommunications service type such that the at least two of the plurality of telecommunication devices of the same type have the same telecommunications service added, and a second set of configuration instructions for configuring the at least two of the plurality of telecommunication devices of the same type to no longer provide a telecommunications service of the telecommunications service type which is currently being provided, such that the at least two of the plurality of telecommunication devices of the same type have the same telecommunications service removed, wherein the at least two telecommunication devices of the same type are each associated with a device type and each set of configuration instructions of the configuration script specifies at least two sequences of configuration instructions associated with respective device types, each of the instruction sequences specifying one or more corresponding synchronization points for synchronizing execution of multiple instances of the script;

computer code for selecting one of the first and second sets of configuration instructions in dependence on the action indicator; and computer code for concurrently executing respective instances of the selected set of configuration instructions of the configuration script for each of the at least two telecommunication devices of the same type to configure the at least two telecommunication devices of the same type to either add a new telecommunications service or remove an existing telecommunications service of the telecommunications service type, a respective one of the instruction sequences being executed for each instance of the selected set of configuration instructions of the configuration script depending on the type of the at least two telecommunication devices of the same type being configured; and computer code for synchronizing the concurrently executing instances of the selected set of instructions of the configuration script for which respective ones of the instruction sequences are being executed using the specified corresponding synchronization point or points.

* * * * *